US011084834B2

(12) United States Patent
List et al.

(10) Patent No.: US 11,084,834 B2
(45) Date of Patent: Aug. 10, 2021

(54) CHIRAL PHOSPHORAMIDIMIDATES AND DERIVATIVES THEREOF

(71) Applicant: STUDIENGESELLSCHAFT KOHLE MBH, Mülheim an der Ruhr (DE)

(72) Inventors: Benjamin List, Mülheim an der Ruhr (DE); Philip Stephan Joseph Kaib, Mülheim an der Ruhr (DE); Lucas Schreyer, Mülheim an der Ruhr (DE); Sunggi Lee, Mülheim an der Ruhr (DE); Roberta Properzi, Mülheim an der Ruhr (DE); Luping Liu, Mülheim an der Ruhr (DE)

(73) Assignee: STUDIENGESELLSCHAFT KOHLE MBH, Muelheim An der Ruhr (DE)

( * ) Notice: Subject to any disclaimer, the term of this patent is extended or adjusted under 35 U.S.C. 154(b) by 0 days.

(21) Appl. No.: 15/756,136

(22) PCT Filed: Aug. 31, 2016

(86) PCT No.: PCT/EP2016/070555
§ 371 (c)(1),
(2) Date: Feb. 28, 2018

(87) PCT Pub. No.: WO2017/037141
PCT Pub. Date: Mar. 9, 2017

(65) Prior Publication Data
US 2018/0339999 A1 Nov. 29, 2018

(30) Foreign Application Priority Data

Sep. 1, 2015 (EP) .................................... 15183404

(51) Int. Cl.
| | |
|---|---|
| C07F 9/24 | (2006.01) |
| C07F 9/6587 | (2006.01) |
| C07F 9/22 | (2006.01) |
| C07F 9/6564 | (2006.01) |
| C07F 9/6578 | (2006.01) |
| C07F 9/44 | (2006.01) |
| C07B 53/00 | (2006.01) |
| C07F 9/6571 | (2006.01) |
| C07F 9/6584 | (2006.01) |

(52) U.S. Cl.
CPC ............... *C07F 9/24* (2013.01); *C07B 53/00* (2013.01); *C07F 9/22* (2013.01); *C07F 9/242* (2013.01); *C07F 9/2495* (2013.01); *C07F 9/44* (2013.01); *C07F 9/4419* (2013.01); *C07F 9/6564* (2013.01); *C07F 9/6578* (2013.01); *C07F 9/6587* (2013.01); *C07F 9/65848* (2013.01); *C07F 9/657154* (2013.01)

(58) Field of Classification Search
None
See application file for complete search history.

(56) References Cited

U.S. PATENT DOCUMENTS

| | | | |
|---|---|---|---|
| 6,340,716 B1 | 1/2002 | Armand et al. | |
| 7,517,828 B2 | 4/2009 | Akiyama | |
| 9,783,561 B2* | 10/2017 | List ...................... | B01J 31/0264 |
| 9,932,305 B2* | 4/2018 | List ...................... | C07D 493/10 |
| 2006/0276329 A1 | 12/2006 | Akiyama | |

FOREIGN PATENT DOCUMENTS

| | | |
|---|---|---|
| CN | 103936821 A | 7/2014 |
| CN | 104039759 A | 9/2014 |
| EP | 1623971 A1 | 2/2006 |
| EP | 2 615 083 A1 | 7/2013 |
| EP | 2 615 098 A1 | 7/2013 |
| WO | 2013 104604 A1 | 7/2013 |
| WO | 2013 104605 A1 | 7/2013 |
| WO | WO-2013104605 A2 * | 7/2013 |

OTHER PUBLICATIONS

Gates ("Regioselective Substitution Reactions of Sulfur(VI)-Nitrogen-Phosphorus Rings" Inorg. Chem. 1996, 35, p. 4301-4309) (Year: 1996).*
Chivers ("Formation and X-ray Crystal Structures of (PH2PN)2(NS(O)NPPh2NPPh2NH2) and Et2NH2+ [(Ph2PN)2(NSO2)]- . . . " Inorg. Chem, 1984, 23, p. 1531-1535 (Year: 1984).*
Rozanov, et al., "Preparation and properties of aminotrihydroxythiatriazaphosphorine anion"; Database Chemical Abstracts Service; XP002754960; 1990.
Gates, et al., Regioselective substitution reactions of sulfur (VI)-nitrogen-phosphorus rings: reactions of the halogenated cyclic thionylphosphazenes . . . , Database Chemical Abstracts Service; XP002754961; 1996.
Suvalova, et al., "Inductive effects of phosphorus-containing substituents" Database Chemical Abstracts Service; XP002754962; 1982.
Tupchienko, et al., "Reaction of monosubstituted amides of diethyl phosphite with sulfur chlorides", Database Chemical Abstracts Service; XP002754963; 1983.
Hasselbring et al., "New cyclic and spirocyclic metal-containing phosphazenes"; Phosphorus, Sulfur, and Silicon, 1994, vol. 93-94; pp. 423-424.
Rong et al., "Rare-earth-metal complexes bearing phosphazene ancillary ligands: structures and catalysis toward highly trans-1,4-selective (co)polymerizations of conjugated dienes"; Organometallics, 2013, 32, pp. 1166-1175.
Jaiswal, et al., "Reactivity of a dihydroboron species: synthesis of a hydroborenium complex and an expedient entry into stable thioxo- and selenoxo-boranes"; Dalton Transactions, 2015, 441 pp. 15779-15785.
IDPi Catalysis, Ange. Chemie Intern. Edit., vol. 58, No. 37, pp. 12761-12777 (Mar. 6, 2019).
Xu, F. et al., "SPINOL-Derived Phosphoric Acids: Synthesis and Application in Enantioselective Friedel-Crafts Reaction of Indoles with Imines", J. Org. Chem., (2010), vol. 7, pp. 8677-8680.

(Continued)

*Primary Examiner* — Amy C Bonaparte
(74) *Attorney, Agent, or Firm* — Norris McLaughlin, P.A.

(57) ABSTRACT

The present invention relates to chiral phosphoramidimidates, their salts and metal complexes as well as derivatives thereof and their use as catalysts.

20 Claims, No Drawings

(56) References Cited

OTHER PUBLICATIONS

Coric, I.; Muiier, S.; List, B., "Kinetic Resolution of Homoaldols via Catalytic Asymmetric Transacetalization.", J. Am. Chem. Soc., (2010), vol. 132, pp. 17370-17373.

Herbert W. Roesky et al., "Sulfur-nitrogen compounds. 29. N-trifluoromethylsulfonyl compounds", Zeitschrift fuer Naturforschung, Teil B: Anorganische Chemie, Organische Chemie, Biochemie, Biophysik, Biologie, 25 (3), 252-254 (1969).

CAS Reg. No. 747388-28-9; Sep. 17, 2004.

\* cited by examiner

CHIRAL PHOSPHORAMIDIMIDATES AND DERIVATIVES THEREOF

This application is a 371 of PCT/EP2016/070555, filed Aug. 31, 2016, which claims foreign priority benefit under 35 U.S.C. § 119 of the European Patent Application No. 15183404.1, filed Sep. 1, 2015, the disclosures of which are incorporated herein by reference.

The present invention relates to chiral phosphoramidimidates, their salts and metal complexes as well as derivatives thereof and their use as catalysts.

Many chemical transformations are catalyzed by Brønsted acids. In enantioselective organocatalysis, this possibility of metal-free, and in the case of chiral Brønsted acids also enantioselective, catalysis is a rapidly growing field with increasing applications. In this field of organocatalysis, a distinction is made between hydrogen bonding catalysts such as thioureas and also TADDOL and BINOL derivatives and stronger Brønsted acids such as phosphoric acid diesters and derivatives thereof as disclosed in EP 1623971. Bulky phosphates have found wide application in asymmetric catalysis, however, it is challenging to further modify their steric environment because, for example, 3,3'-substituents on BINOL radiate away from the active site. Significant synthetic efforts have been undertaken by a number of groups to design alternative backbones that would narrow the chiral environment of the phosphoric acid as discussed in Xu, F. et al. SPINOL-Derived Phosphoric Acids: Synthesis and Application in Enantioselective Friedel-Crafts Reaction of Indoles with Imines. J. Org. Chem. 75, 8677-8680 (2010) and Čorić, I., Müller, S. & List, B. Kinetic Resolution of Homoaldols via Catalytic Asymmetric Transacetalization. J. Am. Chem. Soc. 132, 17370-17373 (2010).

While the fields of chiral Brønsted acid catalysis and chiral anion directed catalysis have acquired wide popularity and importance in recent years, numerous transformations are still elusive. In particular, reactions of small substrates that do not posses sterically demanding protecting groups, large aromatic/planar surfaces, or bulky substituents are still extremely rare. Furthermore reactions including substrates or intermediates lacking spatially defined interactions such as hydrogen bonding with the catalyst are very limited. The reason for these limitations, at least in part, is the inability of current synthetic Brønsted acid catalysts and their respectful anions to provide more variable as well as truly compact chiral microenvironments.

In the prior art, some cyclic imidodiphosphates have been considered as chiral Brønsted acid catalysts or chiral Lewis acid catalysts for some reactions, in particular for the activation of ketones, aldehydes, alkenes, imines, enol ethers, ethers, alkynes, and acetals. They are disclosed in WO2013104604 and are having the basic formula:

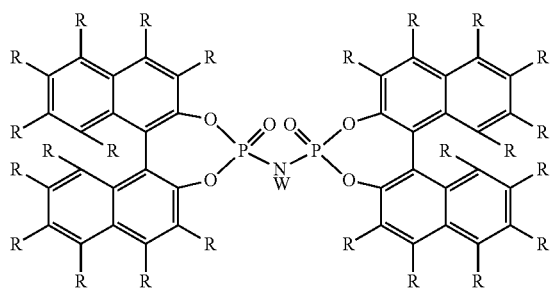

wherein the substituent R may be the same or different on each position and each represents hydrogen, a heterosubstituent, $C_1$ to $C_{20}$ straight chain, branched chain or cyclic aliphatic hydrocarbons, optionally further substituted and W is exemplarily hydrogen. A particular process making use of such imidodiphosphate has been disclosed in WO2013104605. However, said WO2013104605 does not disclose electron withdrawing substituent groups on the phosphor.

Though said cyclic imidodiphosphates can catalyze a number of reactions there are still some reactions where the reaction yields are low and almost zero. In particular, the reactivity of imidodiphosphates is insufficient for many reactions.

Therefore, the preparation of further synthetic Brønsted acid catalysts that display significantly higher reactivity, readily tunable steric environments, and the potential for a highly sterically demanding chiral microenvironment around their active site is desirable.

The present invention provides such new particularly reactive Brønsted acid catalysts by means of new chiral phosphoramidimidates, a simple process for preparing chiral phosphoramidimidates and also their use in catalysis. Said phosphoramidimidate anions are showing a particularly high influence on the reactivity of specific reaction partners which could not be reacted so far using conventional catalysts.

Thus, the present invention provides chiral phosphoramidimidates and derivatives thereof having the general formula (I)

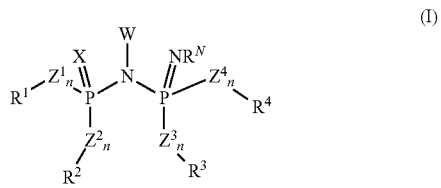

wherein:
X represents O, S, Se or $NR^N$,
$Z^1$ to $Z^4$ may be, independently from each other, the same or different and represent O, S, Se and $NR^N$,
n stands for 0 or preferably 1,
W is a substituent being capable of forming a bond with the phosphoramidimidate moiety,
$R^1$, $R^2$, $R^3$ and $R^4$ may be, independently from each other, the same or different and are each an aliphatic, heteroaliphatic, aromatic or heteroaromatic hydrocarbon group, each optionally being further substituted by one or more heterosubstituents, aliphatic, heteroaliphatic, aromatic or heteroaromatic hydrocarbon groups,
whereby $R^1$ may be forming a ring system with any one of $R^2$, $R^3$ or $R^4$ and the other two of $R^2$, $R^3$ or $R^4$ may be forming a ring system with each other; and
$R^N$ is an electron withdrawing group, being the same or different on each N and being selected from:
i. -alkyl, —CO-alkyl, —(CO)—O-alkyl, sulfinyl alkyl, sulfonyl alkyl, —(P=O)-dialkyl, wherein alkyl is a $C_1$ to $C_{20}$ straight chain, branched chain or cyclic aliphatic hydrocarbon having at least one halogen, preferably F and/or Cl, substituent on the alkyl residue;
ii. aryl, —CO-aryl, —(CO)—O-aryl, sulfinyl aryl, sulfonyl aryl, —(P=O)-diaryl, wherein aryl is a $C_6$ to $C_{18}$ aromatic hydrocarbon, preferably having at least one halogen, preferably F and/or Cl, substituent on the aryl residue;

iii. heteroaryl, —CO-heteroaryl, —(CO)—O-heteroaryl, sulfinyl heteroaryl, sulfonyl heteroaryl, —(P═O)-di-heteroaryl, wherein heteroaryl is a $C_2$ to $C_{20}$ aromatic hydrocarbon, preferably having at least one halogen, preferably F and/or Cl, substituent on the heteroaryl residue; or in case that X represents $NR^N$, one $R^N$ may be bridging the two P═N— units to form a ring structure represented by formula:

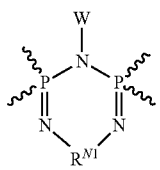

wherein $R^{N1}$ represents —(SO)—, —(SO_2)— or —(NR$^{N2}$)— wherein $R^{N2}$ is an electron withdrawing group being selected from -alkyl, —CO-alkyl, —(CO)—O-alkyl, wherein alkyl is a $C_1$ to $C_{20}$ straight chain, branched chain or cyclic aliphatic hydrocarbon having at least one halogen, preferably F or Cl, substituent on the alkyl residue.

The inventors have found out that by forming the groups around the at least one phosphoramidimidate unit of the chiral compound, the catalytic site thereof can be protected and is perfectly suitable for highly selective catalytic reactions. For these catalytic purposes, it is important for the inventive compound (I) that the groups $R^N$ and $R^{N(1,2)}$ are an electron withdrawing group bearing electron withdrawing substituents(s) such as halogen, in particular fluorine, chlorine, and/or sulfur-oxygen-group(s).

In the following, it is to be understood that the above formula (I) as well as any other formula as used herein comprises any tautomeric form. In this respect, the tautomeric forms as well as polarized bonds $W^{\delta+}$—$N^{\delta-}$ are understood to be covered by said definitions.

In the scope of the present application, the expression "phosphoramidimidates" is to be understood to comprise derivatives thereof, wherein one or more of the oxygen atoms of the phosphoramidimidate moiety is replaced by S, Se, $NR^N$ as defined above as long as they are chiral and preferably enantiopure.

In the above formula (I) and the derived formulae below, it is to be understood that any tautomeric form of the inventive chiral phosphoramidimidates as well as any charged form thereof including any anionic form is to be comprised by the representation of said formula. It is also to be understood that phosphoramidimidates could possess inherent chirality even if all of the groups $R^1$ to $R^4$ are achiral groups. Thus, chirality might also be present for the inventive compounds if P is substituted by four different substituents.

In the above formulae (I), any of $R^1$ to $R^4$ is each selected from $C_1$ to $C_{20}$ straight chain, branched chain or cyclic aliphatic hydrocarbons, optionally having one or more unsaturated bonds such as $C_1$-$C_{20}$-alkyl, $C_2$-$C_{20}$-alkenyl or $C_2$-$C_{20}$-alkinyl, $C_3$-$C_8$-heterocycloalkyl or $C_6$ to $C_{20}$ aromatic hydrocarbon and partially arene-hydrogenated forms such as aryl, aryl-($C_1$-$C_6$)-alkyl, heteroaryl-($C_1$-$C_6$)-alkyl, each hydrocarbon optionally being substituted by one or more groups selected from $C_1$ to $C_{20}$ straight chain, branched chain or cyclic aliphatic hydrocarbons, optionally having one or more unsaturated bonds such as $C_1$-$C_{20}$-alkyl, $C_2$-$C_{20}$-alkenyl or $C_2$-$C_{20}$-alkinyl, or $C_6$ to $C_{20}$ aromatic hydrocarbon and partially arene-hydrogenated forms such as aryl, aryl-($C_1$-$C_6$)-alkyl, heteroaryl-($C_1$-$C_6$)-alkyl or heterosubstituents. $R^1$ and $R^2$ may also be forming a ring system together with $Z^1$ and $Z^2$, and independently, $R^3$ and $R^4$ may also be forming a ring system together with $Z^3$ and $Z^4$, respectively. Any of $R^1$ to $R^4$ may be chiral or may be containing at least one chirality center. In case that n=0, any of $R^1$ to $R^4$ may be bound to P directly.

In the above formula (I), $R^1$ may also be forming a ring system with any one of $R^2$, $R^3$ or $R^4$ and the other two of $R^2$, $R^3$ or $R^4$ may be forming a ring system with each other. Thus, one ring system may be formed on one phosphorimidate unit or may be linking one phosphorimidate unit to the other phosphorimidate unit on either side of the amide center moiety.

As shown above, $R^N$ is an electron withdrawing group, being selected from -alkyl, —CO-alkyl, —(CO)—O-alkyl, sulfinyl alkyl, sulfonyl alkyl, —(P═O)-dialkyl, wherein alkyl is a $C_1$ to $C_{20}$ straight chain, branched chain or cyclic aliphatic hydrocarbon having at least one halogen, preferably F and/or Cl, substituent on the alkyl residue, aryl, —CO-aryl, —(CO)—O-aryl, sulfinyl aryl, sulfonyl aryl, —(P═O)-diaryl, wherein aryl is a $C_6$ to $C_{18}$ aromatic hydrocarbon, preferably having at least one halogen, preferably F and/or Cl, substituent on the aryl residue; heteroaryl, —CO-heteroaryl, —(CO)—O-heteroaryl, sulfinyl heteroaryl, sulfonyl heteroaryl, —(P═O)-di-heteroaryl, wherein heteroaryl is a $C_2$ to $C_{20}$ aromatic hydrocarbon, preferably having at least one halogen, preferably F and/or Cl, substituent on the aryl residue; or in case that X represents $NR^N$, one $R^N$ may be bridging as $R^{N1}$ the two P═N— units to form a ring represented by the formula:

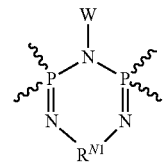

wherein $R^{N1}$ represents —(SO)—, —(SO$_2$)— or —(NR$^{N2}$)— wherein $R^{N2}$ is an electron withdrawing group being selected from -alkyl, —CO-alkyl, —(CO)—O-alkyl, wherein alkyl is a $C_1$ to $C_{20}$ straight chain, branched chain or cyclic aliphatic hydrocarbon having at least one halogen, preferably F or Cl, substituent on the alkyl residue.

As mentioned in case that X represents $NR^N$, one $R^N$ may be present only and may be bridging as $R^{N1}$ the two P═N— units as explained before. Generally, $R^N$ may be preferably selected from electron withdrawing groups which are either present on either P-atom or might be bridging the two P═N— units as indicated, such as

5

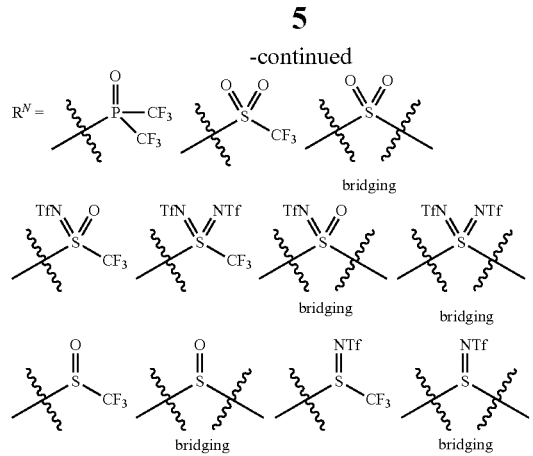

wherein Tf represents the preferred trifluoromethanesulfonyl group or, more generally, a polyfluoro- or perfluoroalkyl-sulfonyl group wherein alkyl can be a $C_1$ to $C_8$ aliphatic hydrocarbon group.

In the above formula (I), W is a substituent being capable of forming an bond with the phosphoramidimidate moiety which may be a ionic or covalent bond which may also be polarized, and thus, W is selected from hydrogen, halogen, a metal such as Li, Na, K, Rb, Cs, Be, Mg, Ca, Sr, Ba, Sc, Ti, V, Cr, Mn, Fe, Co, Ni, Cu, Zn, Y, Zr, Mo, Ru, Rh, Pd, Ag, W, Re, Os, Ir, Pt, Au, Al, Pb, La, Sm, Eu, Yb, U, or a cationic organic group as exemplified in Scheme 2 below, or a substituted silicon such as —$SiR^I R^{II} R^{III}$, wherein $R^I$, $R^{II}$ and $R^{III}$ may be same or different and each stands for hydrogen, halogen, $C_1$ to $C_{20}$ straight chain, branched chain or cyclic aliphatic hydrocarbons, optionally having one or more unsaturated bonds such as $C_1$-$C_{20}$-alkyl, $C_2$-$C_{20}$-alkenyl or $C_2$-$C_{20}$-alkinyl, $C_3$-$C_8$-heterocycloalkyl or $C_6$ to $C_{20}$ aromatic hydrocarbon and partially arene-hydrogenated forms such as aryl, aryl-($C_1$-$C_6$)-alkyl, heteroaryl-($C_1$-$C_6$)-alkyl, each hydrocarbon optionally being substituted by one or more groups selected from $C_1$ to $C_{20}$ straight chain, branched chain or cyclic aliphatic hydrocarbons, optionally having one or more unsaturated bonds such as $C_1$-$C_{20}$-alkyl, $C_2$-$C_{20}$-alkenyl or $C_2$-$C_{20}$-alkinyl, $C_3$-$C_8$-heterocycloalkyl or $C_6$ to $C_{20}$ aromatic hydrocarbon and partially arene-hydrogenated forms such as aryl, aryl-($C_1$-$C_6$)-alkyl, heteroaryl-($C_1$-$C_6$)-alkyl or a heterosubstituent W being hydrogen or the above indicated substituted silicon groups are advantageously used.

The expression "partially arene-hydrogenated forms thereof" is to be understood that in case that the aromatic structure comprises more than one aromatic cycle such as for naphthalene, at least one aromatic cycle, one aromatic cycle remaining, might be partially or fully hydrogenated.

The anionic form may be complemented by any cation for forming an ion pair.

In an embodiment of the above formulae (I), $Z^1$ to $Z^4$ independently represent O, S or $NR^N$, preferably O, n is 1 and X, $R^1$ to $R^4$, $R^N$ as well as W are as defined before, as represented by formula (II):

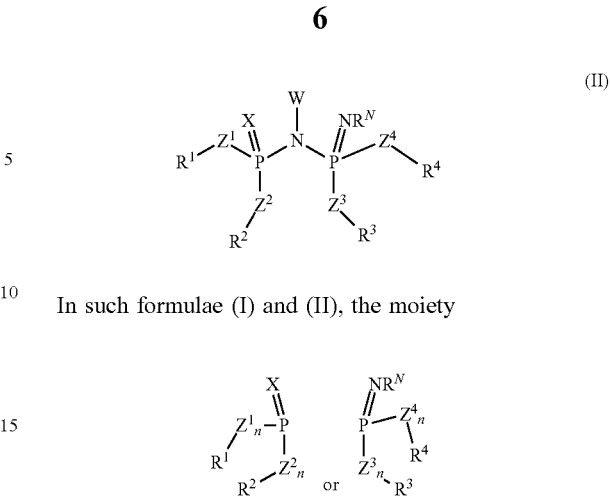

In such formulae (I) and (II), the moiety

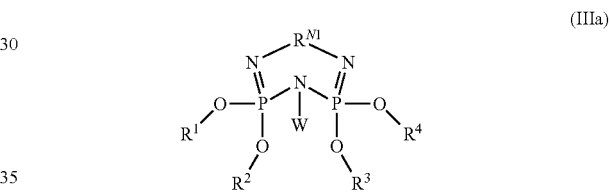

might also be a five to ten-membered ring structure of ($R^1$, $R^2$, $Z^1$, $Z^2$ and —PX—) or ($R^3$, $R^4$, $Z^3$, $Z^4$ and —$PNR^N$—), respectively, wherein $R^1$ to $R^4$, $Z^1$ to $Z^4$, n, $R^N$, X and W are as defined above.

In some embodiments of the compounds of formula (II), the two $NR^N$ may be replaced by one $NR^n$ unit bridging the two P-atoms, as represented by formula (IIIa):

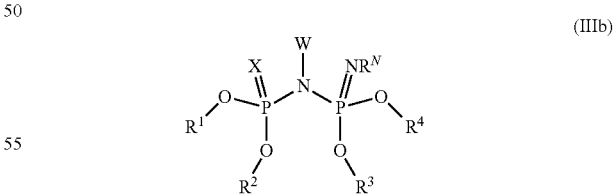

wherein $R^1$ to $R^4$ and W are as defined before wherein $R^{N1}$ represents —(SO)—, —($SO_2$)— or —($NR^{N2}$)— wherein $R^{N2}$ is an electron withdrawing group being selected from -alkyl, —CO-alkyl, —(CO)—O-alkyl, wherein alkyl is a $C_1$ to $C_{20}$ straight chain, branched chain or cyclic aliphatic hydrocarbon having at least one halogen, preferably F or Cl, substituent on the alkyl residue.

In further embodiments of the compounds of formula (II), a chiral phosphoramidimidate according to the invention is represented by formula (IIIb) wherein $Z^1$ to $Z^4$ represent O, $R^1$ to $R^4$, X, $R^N$ and W are as defined before:

(IIIb)

wherein $R^N$ is an electron withdrawing group, being the same or different on each N and being selected from -alkyl, —CO-alkyl, —(CO)—O-alkyl, sulfinyl alkyl, sulfonyl alkyl, —(P=O)-dialkyl, wherein alkyl is a $C_1$ to $C_{20}$ straight chain, branched chain or cyclic aliphatic hydrocarbon having at least one halogen, preferably F and/or Cl, substituent on the alkyl residue; aryl, —CO-aryl, —(CO)—O-aryl, sulfinyl aryl, sulfonyl aryl, —(P=O)-diaryl, wherein aryl is a $C_6$ to $C_{18}$ aromatic hydrocarbon, preferably having at least one halogen, preferably F and/or Cl, substituent on the aryl residue; heteroaryl, —CO-heteroaryl, —(CO)—O-heteroaryl, sulfinyl heteroaryl, sulfonyl heteroaryl, —(P=O)-di-heteroaryl, wherein heteroaryl is a $C_2$ to $C_{20}$ aromatic hydrocarbon, preferably having at least one halogen, preferably F and/or Cl, substituent on the heteroaryl residue.

In such formulae (I), (II) or (IIIa/b), at least one of ($R^1$, $R^2$, $Z^1$ and $Z^2$) and ($R^3$, $R^4$, $Z^3$ and $Z^4$), respectively, may form a ring structure derived from a bridged aromatic structure such as biphenyl optionally substituted, BINOL, TADDOL, VAPOL, SPINOL, 1,1'-binaphthalene, 1,1'-bianthracene, 1,1-biphenanthrene, or a partially arene-hydrogenated form of such aromatic ring structure such as 8H-BINOL, each of said rings systems optionally being substituted by one or more substituents which may be the same or different on each position and is each selected from hydrogen, heterosubstituents, $C_1$ to $C_{20}$ straight chain, branched chain or cyclic aliphatic hydrocarbons, optionally having one or more unsaturated bonds such as $C_1$-$C_{20}$-alkyl, $C_2$-$C_{20}$-alkenyl or $C_2$-$C_{20}$-alkinyl, $C_3$-$C_8$-heterocycloalkyl or $C_6$ to $C_{20}$ aromatic hydrocarbon and partially arene-hydrogenated forms such as aryl, aryl-($C_1$-$C_6$)-alkyl, heteroaryl-($C_1$-$C_6$)-alkyl, each hydrocarbon optionally being substituted by one or more groups selected from $C_1$ to $C_{20}$ straight chain, branched chain or cyclic aliphatic hydrocarbons, optionally having one or more unsaturated bonds such as $C_1$-$C_{20}$-alkyl, $C_2$-$C_{20}$-alkenyl or $C_2$-$C_{20}$-alkinyl, $C_3$-$C_8$-heterocycloalkyl or $C_6$ to $C_{20}$ aromatic hydrocarbon and partially arene-hydrogenated forms such as aryl, aryl-($C_1$-$C_6$)-alkyl, heteroaryl-($C_1$-$C_6$)-alkyl or a heterosubstituent, wherein n, $R^N$, X and W are as defined before, including its tautomeric and ionic forms, and derivatives thereof. In such formulae (IIIa/b), the ring structure formed by $R^1$, $R^2$, $Z^1$ and $Z^2$) and ($R^3$, $R^4$, $Z^3$ and $Z^4$) may be the same or different and may be chiral, wherein n, $R^N$, X and W are as defined before.

In another embodiment, the compounds of formula (I) may be represented by formula (IV):

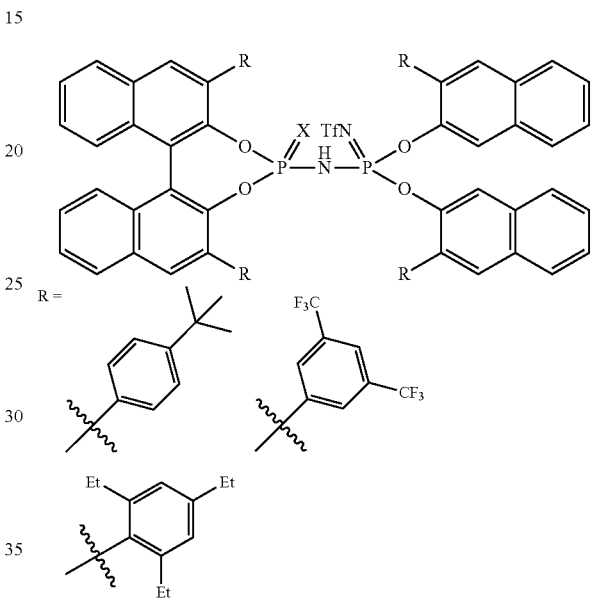

(IV)

wherein in said formula (IV), the substituent R may be same or different on each position and is each selected from hydrogen, heterosubstituents, $C_1$ to $C_{20}$ straight chain, branched chain or cyclic aliphatic hydrocarbons, optionally having one or more unsaturated bonds such as $C_1$-$C_{20}$-alkyl, $C_2$-$C_{20}$-alkenyl or $C_2$-$C_{20}$-alkinyl, $C_3$-$C_8$-heterocycloalkyl or $C_6$ to $C_{20}$ aromatic hydrocarbon and partially arene-hydrogenated forms such as aryl, aryl-($C_1$-$C_6$)-alkyl, heteroaryl-($C_1$-$C_6$)-alkyl, and each hydrocarbon optionally being substituted by one or more groups selected from $C_1$ to $C_{20}$ straight chain, branched chain or cyclic aliphatic hydrocarbons, optionally having one or more unsaturated bonds such as $C_1$-$C_{20}$-alkyl, $C_2$-$C_{20}$-alkenyl or $C_2$-$C_{20}$-alkinyl, $C_3$-$C_8$-heterocycloalkyl or $C_6$ to $C_{20}$ aromatic hydrocarbon and partially arene-hydrogenated forms such as aryl, aryl-($C_1$-$C_6$)-alkyl, heteroaryl-($C_1$-$C_6$)-alkyl, or a heterosubstituent, and $R^N$, X and W are as defined before, including its tautomeric and ionic forms, and derivatives thereof.

The substituents R on the structure, preferably a ring structure, proximal to the —Z—P-bond, such as the —O—P-bond, are preferably bulky groups and may also be selected from the definitions for $R^N$ or heterosubstituents.

Basically, any chiral groups are possible as chiral groups for the inventive compounds. If the other group in each case is not chiral, the groups $R_1$ to $R_4$ are any organic group which may be saturated or unsaturated, linear, cyclic or heterocyclic, aromatic and/or heteroaromatic.

Three examples of said compound having the formula (IV), where X may be O or NTf, are shown below:

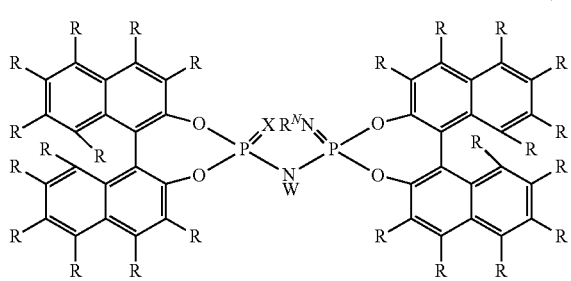

In organic synthesis, particularly in the synthesis of pharmaceutical active compounds, chiral compounds are frequently used as catalysts in order to obtain the desired product in a high enantiomeric purity or diastereomeric purity.

It has been found that the compounds according to the invention are well suited as catalysts for enantioselective synthesis. Here, they function as chiral Brønsted acids or the conjugated bases thereof as chiral anions in enantioselective catalyses directed by counterions.

The following definitions apply to the individual groups R, $R^N$, $R^{N1}$, $R^{N2}$ and $R^1$ to $R^4$ equally as follows.

A heterosubstituent as defined according to the invention can be selected from OH, F, Cl, Br, I, CN, $NO_2$, $SO_3H$, a monohalogenomethyl group, a dihalogenomethyl group, a trihalogenomethyl group, $CF(CF3)_2$, $SF_5$, amine bound through N atom, —O-alkyl (alkoxy), —O-aryl, —O—$SiR^S_3$, S—$R^S$, S(O)—$R^S$, $S(O)_2$—$R^S$, COOH, $CO_2$—$R^S$, —$BR^S_2$, —$PR^S_2$. —$OPR^S_2$, amide, bound through C or N atom, formyl group, C(O)—$R^S$, COOM, where M is a metal such as Na or K. $R^S$ may be, independently from each other, the same or different and is each an aliphatic, heteroaliphatic, aromatic or heteroaromatic group, each optionally being further substituted by one or more heterosubstituents, aliphatic, heteroaliphatic, aromatic or heteroaromatic groups.

Aliphatic hydrocarbons including alkyl, alkenyl and alkinyl may comprise straight-chain, branched and cyclic hydrocarbons.

Heteroaliphatic is a hydrocarbon including alkyl, alkenyl and alkinyl which may comprise straight-chain, branched and cyclic hydrocarbons with one or more carbon atoms substituted with a heteroatom.

In more detail, $C_1$-$C_{20}$-alkyl can be straight chain or branched and has 1, 2, 3, 4, 5, 6, 7, 8, 9, 10, 11, 12, 13, 14, 15, 16, 17, 18, 19 or 20 carbon atoms. Alkyl might be $C_1$-$C_6$-alkyl, in particular methyl, ethyl, propyl, isopropyl, butyl, isobutyl, sec-butyl or tert-butyl, likewise pentyl, 1-, 2- or 3-methylpropyl, 1,1-, 1,2- or 2,2-dimethylpropyl, 1-ethylpropyl, hexyl, 1-, 2-, 3- or 4-methylpentyl, 1,1-, 1,2-, 1,3-, 2,2-, 2,3- or 3,3-dimethylbutyl, 1- or 2-ethylbutyl, 1-ethyl-1-methylpropyl, 1-ethyl-2-methylpropyl, 1,1,2- or 1,2,2-trimethylpropyl. Substituted alkyl groups are trifluoromethyl, pentafluoroethyl and 1,1,1-trifluoroethyl.

Cycloalkyl might be cyclopropyl, cyclobutyl, cyclopentyl, cyclohexyl or cycloheptyl. Alkenyl might be $C_2$-$C_{20}$ alkenyl. Alkinyl might be $C_2$-$C_{20}$ alkinyl.

Said unsaturated alkenyl- or alkinyl groups can be used for linking the inventive compounds to a carrier such as a polymer to serve for an immobilized catalyst.

Halogen is F, Cl, Br or I.

Alkoxy is preferably $C_2$-$C_{10}$ alkoxy such as methoxy, ethoxy, propoxy, tert-butoxy etc.

$C_3$-$C_8$-Heterocycloalkyl having one or more heteroatoms selected from among N, O and S is preferably 2,3-dihydro-2-, -3-, -4- or -5-furyl, 2,5-dihydro-2-, -3-, -4- or -5-furyl, tetrahydro-2- or -3-furyl, 1,3-dioxolan-4-yl, tetrahydro-2- or -3-thienyl, 2,3-dihydro-1-, -2-, -3-, -4- or -5-pyrrolyl, 2,5-dihydro-1-, -2-, -3-, -4- or -5-pyrrolyl, 1-, 2- or 3-pyrrolidinyl, tetrahydro-1-, -2- or -4-imidazolyl, 2,3-dihydro-1-, -2-, -3-, -4- or -5-pyrazolyl, tetrahydro-1-, -3- or -4-pyrazolyl, 1,4-dihydro-1-, -2-, -3- or -4-pyridyl, 1,2,3,4-tetrahydro-1-, -2-, -3-, -4-, -5- or -6-pyridyl, 1-, 2-, 3- or 4-piperidinyl, 2-, 3- or 4-morpholinyl, tetrahydro-2-, -3- or -4-pyranyl, 1,4-dioxanyl, 1,3-dioxan-2-, -4- or -5-yl, hexahydro-1-, -3- or -4-pyridazinyl, hexahydro-1-, -2-, -4- or -5-pyrimidinyl, 1-, 2- or 3-piperazinyl, 1,2,3,4-tetrahydro-1-, -2-, -3-, -4-, -5-, -6-, -7- or -8-quinolyl, 1,2,3,4-tetrahydro-1-, -2-, -3-, -4-, -5-, -6-, -7- or -8-isoquinolyl, 2-, 3-, 5-, 6-, 7- or 8-3,4-dihydro-2H-benzo-1,4-oxazinyl.

Optionally substituted means unsubstituted or monosubstituted, disubstituted, trisubstituted, tetrasubstituted, pentasubstituted, or even further substituted for each hydrogen on the hydrocarbon.

Aryl might be phenyl, naphthyl, anthracenyl, phenanthryl or biphenyl.

Arylalkyl might be benzyl.

Heteroaryl having one or more heteroatoms selected from among N, O and S is preferably 2- or 3-furyl, 2- or 3-thienyl, 1-, 2- or 3-pyrrolyl, 1-, 2-, 4- or 5-imidazolyl, 1-, 3-, 4- or 5-pyrazolyl, 2-, 4- or 5-oxazolyl, 3-, 4- or 5-isoxazolyl, 2-, 4- or 5-thiazolyl, 3-, 4- or 5-isothiazolyl, 2-, 3- or 4-pyridyl, 2-, 4-, 5- or 6-pyrimidinyl, also preferably 1,2,3-triazol-1-, -4- or -5-yl, 1,2,4-triazol-1-, -3- or -5-yl, 1- or 5-tetrazolyl, 1,2,3-oxadiazol-4- or -5-yl, 1,2,4-oxadiazol-3- or -5-yl, 1,3,4-thiadiazol-2- or -5-yl, 1,2,4-thiadiazol-3- or -5-yl, 1,2,3-thiadiazol-4- or -5-yl, 3- or 4-pyridazinyl, pyrazinyl, 1-, 2-, 3-, 4-, 5-, 6- or 7-Indolyl, 4- or 5-isoindolyl, 1-, 2-, 4- or 5-benz-imidazolyl, 1-, 3-, 4-, 5-, 6- or 7-benzopyrazolyl, 2-, 4-, 5-, 6- or 7-benzoxazolyl, 3-, 4-, 5-, 6- or 7-benzisoxazolyl, 2-, 4-, 5-, 6- or 7-benzothiazolyl, 2-, 4-, 5-, 6- or 7-benzisothiazolyl, 4-, 5-, 6- or 7-benz-2,1,3-oxadiazolyl, 2-, 3-, 4-, 5-, 6-, 7- or 8-quinolyl, 1-, 3-, 4-, 5-, 6-, 7- or 8-isoquinolyl, 3-, 4-, 5-, 6-, 7- or 8-cinnolinyl, 2-, 4-, 5-, 6-, 7- or 8-quinazolinyl, 5- or 6-quinoxalinyl, 2-, 3-, 5-, 6-, 7- or 8-2H-benzo-1,4-oxazinyl, also preferably 1,3-benzodioxol-5-yl, 1,4-benzodioxan-6-yl, 2,1,3-benzothiadiazol-4- or -5-yl or 2,1,3-benzoxadiazol-5-yl.

In a preferred embodiment of the present invention as for example shown in formula (IV), at least one of R proximal to the —O—P— bond is not hydrogen and is selected from among methyl, ethyl, isopropyl, cyclohexyl, cyclopentyl, phenyl, 2,4,6-triisopropylphenyl, 2,4,6-triethylphenyl, 2,6-diethylphenyl, 2,6-diethylphenyl, 2-isopropylphenyl, 5-methyl-2-isopropylphenyl, mesityl, 9-phenanthryl, 9-anthracenyl, ferrocenyl, N-(perfluorophenyl)acetamide, N-(4-chlorophenyl)acetamide, N-(naphthalen-1-yl)acetamide, N-benzhydrylacetamide, N-(2,6-diisopropylphenyl)acetamide, 6,8-dimethylpyren-2-yl, 2-pyrenyl, 1-anthracenyl, corannulene, porphyrin, 1-naphthyl, 2-naphthyl, 4-biphenyl, 3,5-(trifluoromethyl)phenyl, 2,6-dimethylphenyl, tert-butyl, tris-methylsilyl, tert-butydimethylsilyl, phenyldimethylsilyl, methyldiphenylsilyl, tris-mesitylsilyl, tris-phenylsilyl, 4-nitrophenyl and 2,6-methyl-4-butylphenyl, trifluoromethyl, unbranched (linear) and branched ($C_1$-$C_{12}$)-perfluoroalkyls, 3,4,5-trifluorophenyl, 1,3-bis(perfluoropropan-2-yl)phenyl, 1,3-bis(perfluorobutyl)phenyl and/or pentafluorophenyl and also fluoride, chloride, bromide, iodide, COOH, $B(OH)_2$, $B(alkyl)_2$, $B(O-alkyl)_2$, B(pinacol), $BF_3X$ where X=Na or K, OTf. The other groups are preferably hydrogen.

The compounds according to the invention can be converted in process steps which are well known per se to those skilled in the art into organic salts, metal salts or metal complexes. In one possible embodiment, the phosphoramidimidates are reacted with an appropriate metal salt, for example with the carbonate or acetate of the appropriate metal. Examples of organic salts, metal salts and metal complexes are shown in the following Scheme 1 for formula (V):

Scheme 1: General examples of metal salts and metal complexes of the phosphoramidimidates (V).

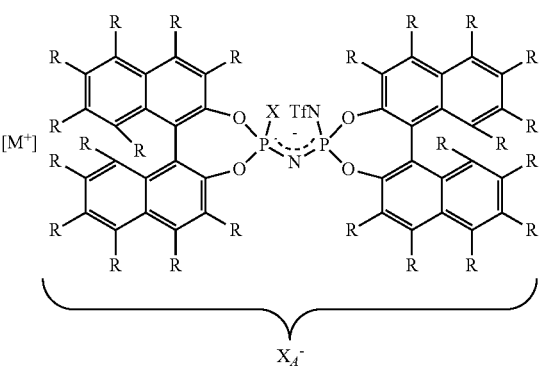

(V)

In Scheme 1, any metals or organic cations, e.g. tertiary ammonium ions, can be represented by M. Even though the compounds are shown as salts in scheme 1, the precise structure with metals is not known; they can also have the structure of metal complexes. The formulation metal salts or metal complexes is therefore used for the purposes of the present invention. The metal compounds are not restricted to particular metal compounds or complexes. Suitable metal compounds are derived from Li, Na, K, Rb, Cs, Be, Mg, Ca, Sr, Ba, Sc, Ti, V, Cr, Mn, Fe, Co, Ni, Cu, Zn, Y, Zr, Mo, Ru, Rh, Pd, Ag, W, Re, Os, Ir, Pt, Au, Al, Pb, La, Sm, Eu, Yb, U.

Scheme 2: Examples of possible cations $M^+X_A^-$

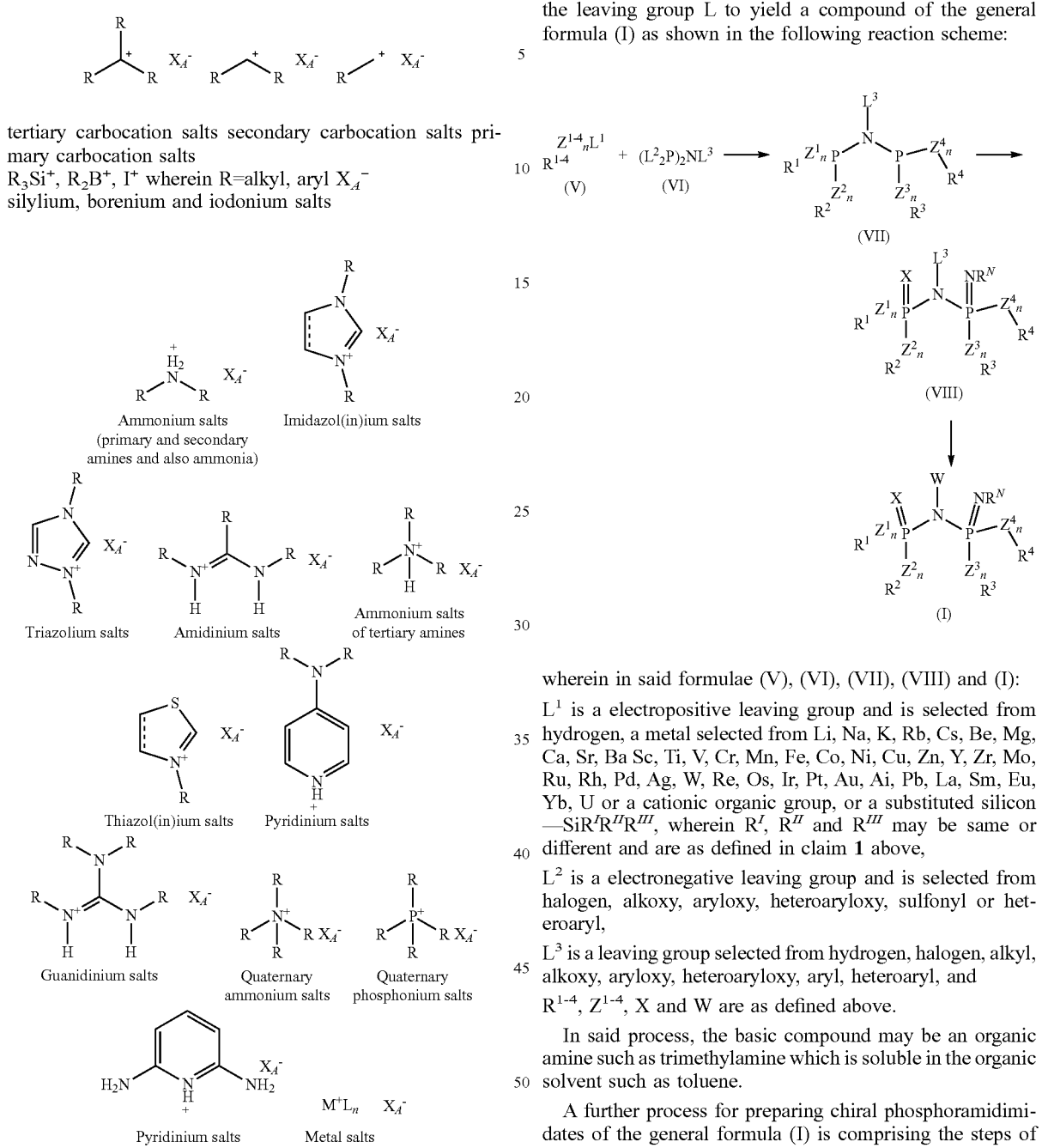

tertiary carbocation salts  secondary carbocation salts  primary carbocation salts
$R_3Si^+$, $R_2B^+$, $I^+$ wherein R=alkyl, aryl $X_A^-$
silylium, borenium and iodonium salts Ammonium salts (primary and secondary amines and also ammonia)   Imidazol(in)ium salts Triazolium salts   Amidinium salts   Ammonium salts of tertiary amines Thiazol(in)ium salts   Pyridinium salts Guanidinium salts   Quaternary ammonium salts   Quaternary phosphonium salts Pyridinium salts   Metal salts The phosphoramidimidates of the invention (in their ionic form indicated above as $X_A^-$) and their organic salts, metal salts and metal complexes can be prepared according an exemplary reaction path shown for imido-di-(BINOL-phosphate):

The present invention is also directed to processes for preparing the inventive phosphoramidimidates. A process for preparing said chiral phosphoramidimidates of the general formula (I) may be comprising the steps of reacting a compound of the general formulae (V) in equivalent stoichiometric amounts with a compound of the formula (VI) in the presence of a basic compound in an organic solvent to yield a compound of the formula (VII), further reacting compound (VII) in a two step oxidation, for example with triflic azide, to yield compound (VIII) and finally removing the leaving group L to yield a compound of the general formula (I) as shown in the following reaction scheme:

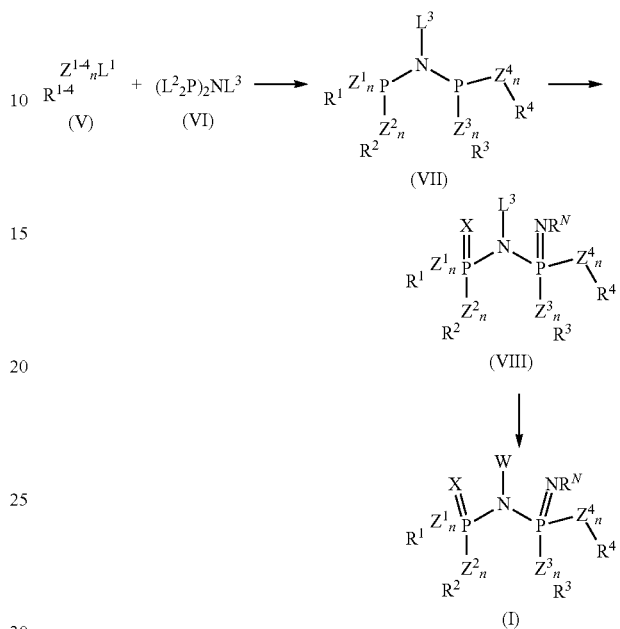

wherein in said formulae (V), (VI), (VII), (VIII) and (I):

$L^1$ is a electropositive leaving group and is selected from hydrogen, a metal selected from Li, Na, K, Rb, Cs, Be, Mg, Ca, Sr, Ba Sc, Ti, V, Cr, Mn, Fe, Co, Ni, Cu, Zn, Y, Zr, Mo, Ru, Rh, Pd, Ag, W, Re, Os, Ir, Pt, Au, Ai, Pb, La, Sm, Eu, Yb, U or a cationic organic group, or a substituted silicon —$SiR^IR^{II}R^{III}$, wherein $R^I$, $R^{II}$ and $R^{III}$ may be same or different and are as defined in claim 1 above, $L^2$ is a electronegative leaving group and is selected from halogen, alkoxy, aryloxy, heteroaryloxy, sulfonyl or heteroaryl, $L^3$ is a leaving group selected from hydrogen, halogen, alkyl, alkoxy, aryloxy, heteroaryloxy, aryl, heteroaryl, and $R^{1-4}$, $Z^{1-4}$, X and W are as defined above.

In said process, the basic compound may be an organic amine such as trimethylamine which is soluble in the organic solvent such as toluene.

A further process for preparing chiral phosphoramidimidates of the general formula (I) is comprising the steps of reacting a compound of the general formulae (IX) with a compound of the formula (X) in the presence of a basic compound in an organic solvent to yield a compound of the formula (I) as shown in the following reaction scheme:

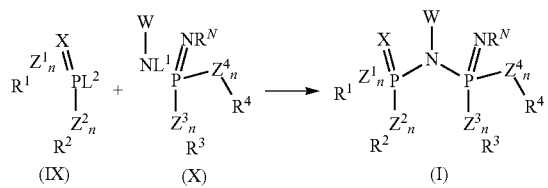

wherein in said formulae (IX), (X), and (I):

L$^1$ is a electropositive leaving group and is selected from hydrogen, a metal selected from Li, Na, K, Rb, Cs, Be, Mg, Ca, Sr, Ba Sc, Ti, V, Cr, Mn, Fe, Co, Ni, Cu, Zn, Y, Zr, Mo, Ru, Rh, Pd, Ag, W, Re, Os, Ir, Pt, Au, Al, Pb, La, Sm, Eu, Yb, U or a cationic organic group, or a substituted silicon —SiR$^I$R$^{II}$R$^{III}$, wherein R$^I$, R$^{II}$ and R$^{III}$ may be same or different and are as defined in claim 1 above, L$^2$ is a electronegative leaving group and is selected from halogen, alkoxy, aryloxy, heteroaryloxy, sulfonyl or heteroaryl, and R$^{1-4}$, Z$^{1-4}$, X and W are as defined as above.

The basic compound may also be here an organic amine such as trimethylamine which is soluble in the organic solvent such as toluene.

A still further process for preparing chiral phosphoramidimidates of the general formula (I) comprising the steps of reacting a compound of the general formulae (XI) with a compound of the formula (XII) in an organic solvent to yield a compound of the formula (I) as shown in the following reaction scheme:

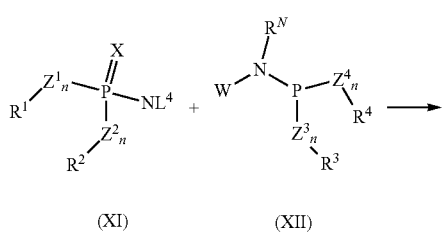

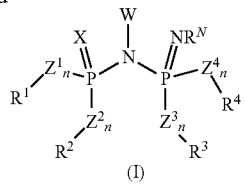

wherein in said formulae (XI), (XII) and (I):
L$^4$ represents a leaving group selected from N$_2$, or a combination of L$^1$ and L$^2$, and
R$^{1-4}$, Z$^{1-4}$, X and W are as defined above.

The organic solvent may be here a solvent or a solvent mixture of toluene and THF.

In more detail, phosphoramidimidates of the invention (in their ionic form indicated above as X$_A^-$) and their organic salts, metal salts and metal complexes may be prepared according an exemplary reaction path shown for imido-di-(BINOL-phosphate):

Scheme 2.1

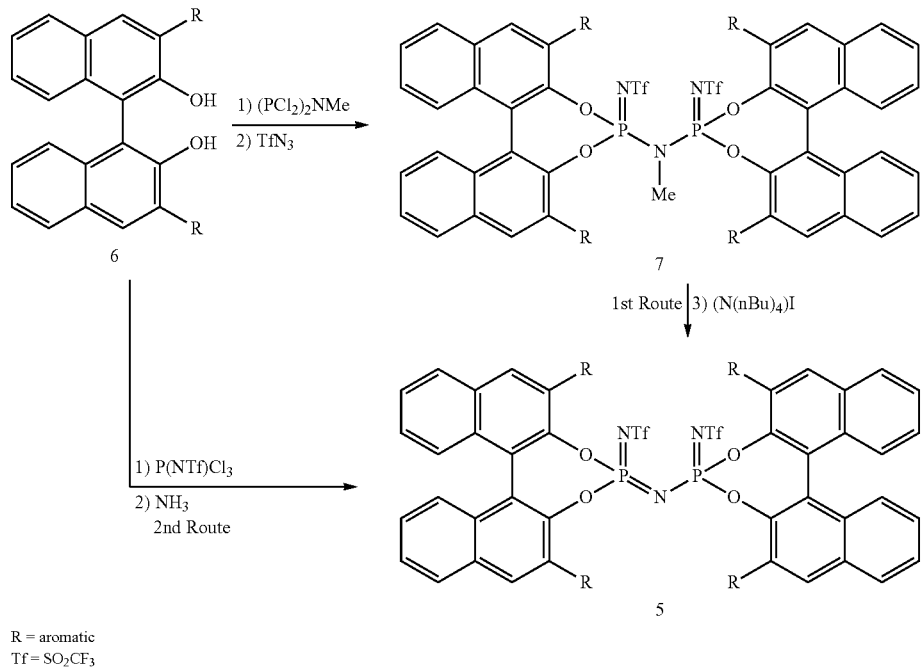

R = aromatic
Tf = SO$_2$CF$_3$

The conversion of BINOL derived diols (6) was achieved by dimerization with commercial (PCl$_2$)$_2$NMe, followed by an oxidation with CF$_3$SO$_2$N$_3$(Staudinger reaction) generating compound 7, which was demethylated affording catalyst precursor 5 (1st Route, Scheme 2.1). Upon initial application of the new catalyst motif achieving so far unknown reactivities with good enantioselectivities in the Hosomi-Sakurai reaction, the inventors developed a 2nd Route one pot catalyst synthesis (2nd Route, Scheme 2.1).

The crucial element was the access of P(NTf)Cl$_3$ in analytically pure form. All described methods to generate P(NTf)Cl$_3$ required either explosive and/or toxic chemicals giving impure material. The inventors developed a solid state reaction, in which TfNH$_2$ and PCl$_5$ were heated under reduced pressure, affording analytically pure P(NTf)Cl$_3$ upon single fractional distillation. With this reagent in hand, the inventors prepared the new catalyst 5 dimer as accessible from commercial 3,3'-substituted BINOL derived diols.

Therefore, the present invention also comprises the process for preparing the key compound P(NTf)Cl₃ by reacting TfNH₂ with an overstoichiometric amount of PCl₅ (1-2 equimolar amount) under reduced pressure below 760 mbar, preferably 100 to 400 mbar in the absence of a solvent to a temperature range of 80° C. to 200° C. until the development of hydrochloric acid gas stops.

Scheme 2.2

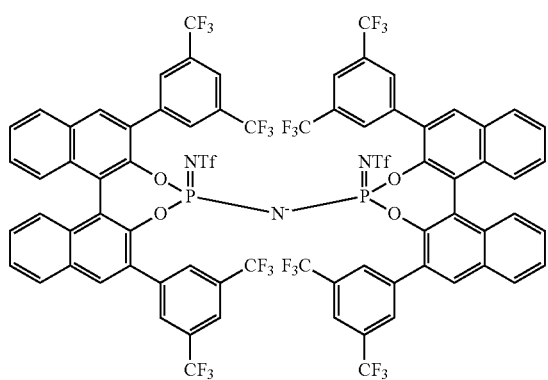

More generally, P(NR)R$^P_{3-x}$Cl$_X$ can be prepared by reacting R$\hat{N}$H₂ and PR$^P_{5-y}$Cl$_y$, in an overstoichiometric amount of PR$^P_{5-y}$Cl$_y$ of 1-2 equimolar amount under reduced pressure below 760 mbar, preferably 100 to 400 mbar in the absence of a solvent to a temperature range of 80° C. to 200° C. until the development of hydrochloric acid gas stops, optionally followed by a maturing step at said temperature for a period of time of up to 240 min and optionally followed by a purification step such as a distillation of the obtained product, wherein x is an integer from 1 to 3, y is an integer from 1 to 5 and R$^P$ is an hydrocarbon group, which may be the same or different, which is selected from alkyl, alkoxy, aryl, aryloxy, heteroaryl and heteroaryloxy, and which is having 1 to 60 carbon atoms and is optionally substituted. The resulting P(NR)R$^P_{3-x}$Cl$_X$ can then be used for preparing the inventive chiral phosphoramidimidates and derivatives thereof.

The inventors found out that the crystal structure of N-triflyl phosphoramidimidate 5a, and of further inventive compounds having the N-triflyl phosphoramidimidate central unit, reveals a confined active site within a highly sterically demanding chiral environment (FIG. 2.2). The P—N—P bond angles alter between 140° to 160°, which allows a conformation suggesting an intramolecular hydrogen bond (TfNH—O₂SCF₃) stabilizing the acidic proton deeply buried in the chiral microenviroment. This supports proton location on the NTf-atom rather than the bridging N-atom on the bottom, which is also inaccessible to substrates due to the installed 3,3'-substituents.

Using inventive catalyst design allowed the first highly enantioselective catalytic Hosomi-Sakurai reaction (Scheme 3). N-triflyl phosphoramidimidate acid catalyst 5 proved quite general, and various homoallylic alcohols 8 were obtained with high enantioselectivity (Scheme 3). Aromatic aldehydes 9 were converted at −78° C. with 1 mol % of N-triflyl phosphoramidimidate 5b with 2-naphthyl substituents on the 3,3'-positions of the two BINOL backbones. More basic aliphatic aldehydes 9 required higher temperatures and catalyst loadings (5 mol %). Contrarily to aromatic aldehydes, even lower temperatures (−90° C.) and catalyst loadings (0.05 mol %) could be employed with aliphatic aldehydes. N-triflyl phosphoramidimidate 5c with 3,5-Me₂C₆H₃ substituents on the 3,3'-positions gave excellent enantioselectivities. The electronic properties of the active catalyst center showed significant dependencies on inductive effects of the substituents installed. The electron deficient N-triflyl phosphoramidimidate 5a was barely active in the Hosomi-Sakurai reaction, instead the aliphatic aldehyde 9e was trimerized. Catalyst dimer 5c showed a significant preference for silyl group transfer from alkene 8 to aliphatic aldehydes 9. The relatively electron neutral phosphoramidimidate 5d with simple phenyl substitution formed exclusively aliphatic alcohols 8 with lower enantioselectivities. The preference of catalyst dimer 5c for silyl transfer was circumvented upon usage of chlorinated solvents. Increased catalyst loadings (1 mol %) furnished trimethylsilyl protected alcohols (89% yield) in less than two hours at −78° C. Linear, β-, and γ-branched aldehydes were also suitable substrates. On preparative scale 1.4 g of aldehyde was converted by 6,8-dimethylpyren-2-yl catalyst (10 mg, 0.05 mol %) at −78° C. within 5 d. Recent developments in Brønsted and Lewis acid catalysis were limited to aromatic or quaternary aldehydes in the Hosomi-Sakurai reaction. The inventors have shown here that confined Brønsted acids with extreme steric demand and chiral pockets reminiscent of those found in enzymes can overcome this limitation and solve an important problem in organic synthesis. The present bottom up catalyst design generating completely artificial enzyme like pockets allows the first enantioselective Brønsted acid catalyzed addition of allyltrimethylsilanes to aldehydes. The inventors believe that the mild reaction conditions are to find applications in the synthesis of diverse natural products and biologically active molecules. This crossover of Brønsted and Lewis acid catalysis allows handling of small aliphatic and/or loosely bound molecules entering the realm of transition metal catalysis.

Use as Catalysts

The inventors have carried out various studies on asymmetric Mukaiyama aldol reactions and Hosomi-Sakurai reaction catalyzed by disulfonimides, and they focused on the asymmetric Brønsted acid catalyzed addition of allyltrimethylsilanes to aldehydes. The envisaged asymmetric addition of allyttrimethylsilanes to carbonyls with high selectivity is unknown with chiral Brønsted acid catalysts and the inventors considered that the absence of a compact chiral environment for the relatively small O-silylated oxonium cation, which lacks specific and sterically well defined interactions with its chiral anion, resulted in poor enantiofacial discrimination. Whereas large active sites can accommodate various transition state geometries leading to different isomers, a confined space could limit this freedom and thereby increase selectivity.

The inventors realized that a solution of the Hosomi-Sakurai reaction is a crossover of two independent research areas of broad significance in current Brønsted acid catalysis. The combination of confined Brønsted acids and silyl cation asymmetric counter anion directed (ACDC) catalysis would allow reactions with small aliphatic substrates at rates and catalyst loadings rivaling those of enzymes and highly active transition metal catalysts.

Thus the specific phosphoramidimidates of the invention and their organic salts, metal salts and metal complexes are particularly suitable as strong, chiral Brønsted acid catalysts or chiral Lewis acid catalysts for many reactions, in particular for the activation of ketones, aldehydes, alkenes, imines, enol ethers, ethers, alkynes, and acetals.

The reactions in which compounds according to the invention can be used as catalysts include reactions such as aldol reactions, vinylogous aldol reactions, Mukaiyama aldol reactions, vinylogous Mukaiyama aldol reactions, Mukaiyama-Michael reactions, Michael additions, Mannich reactions, TMSCN additions to aldehydes and ketones and to imines, esterifications, etherifications, pinacol rearrangements, acetalizations, transacetalization, spiroacetalization and related reactions, cycloadditions, hydroaminations, hydroalkoxylation, hydrations, haloalkoxylation, haloamination, olefin activations in general, Friedel-Crafts reactions, epoxide openings, Ritter reactions, nucleophilic substitutions of alcohols, asymmetric ring openings, asymmetric reductions, transfer hydrogenations, alkyne additions, imine additions, Strecker reactions, allylations, propargylations, reductions, epoxidations, olefin metathesis, isomerizations, Diels-Alder reactions, hetero-Diels-Alder reactions, aminalizations, iminium catalysis and enamine catalysis, as exemplified in the following reaction schemes.

In particular, they are useful for reactions such as shown in the following Schemes 3 and 4 catalyzed by the catalyst of the above general formula wherein R has the structure as given above.

Scheme 3

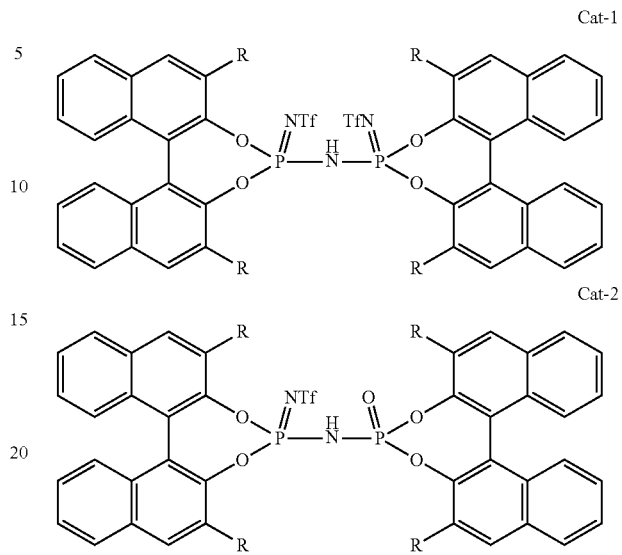

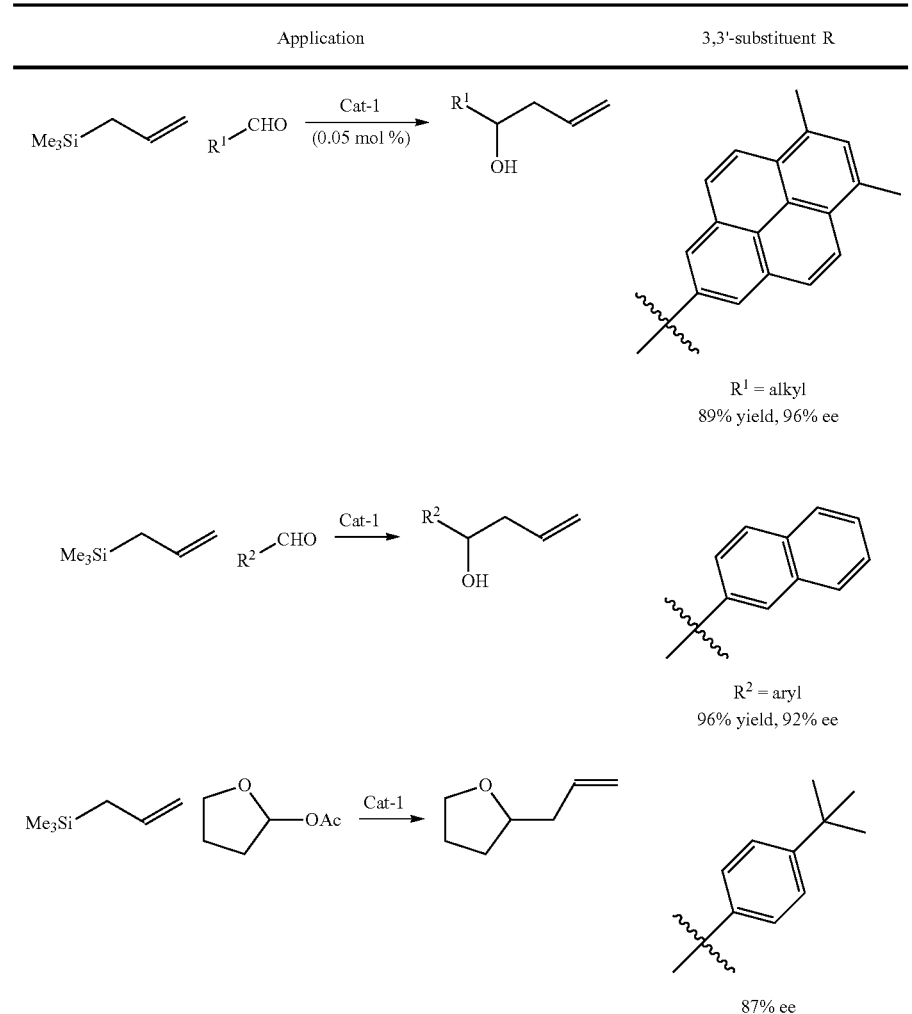

-continued
| Application | 3,3'-substituent R |
|---|---|
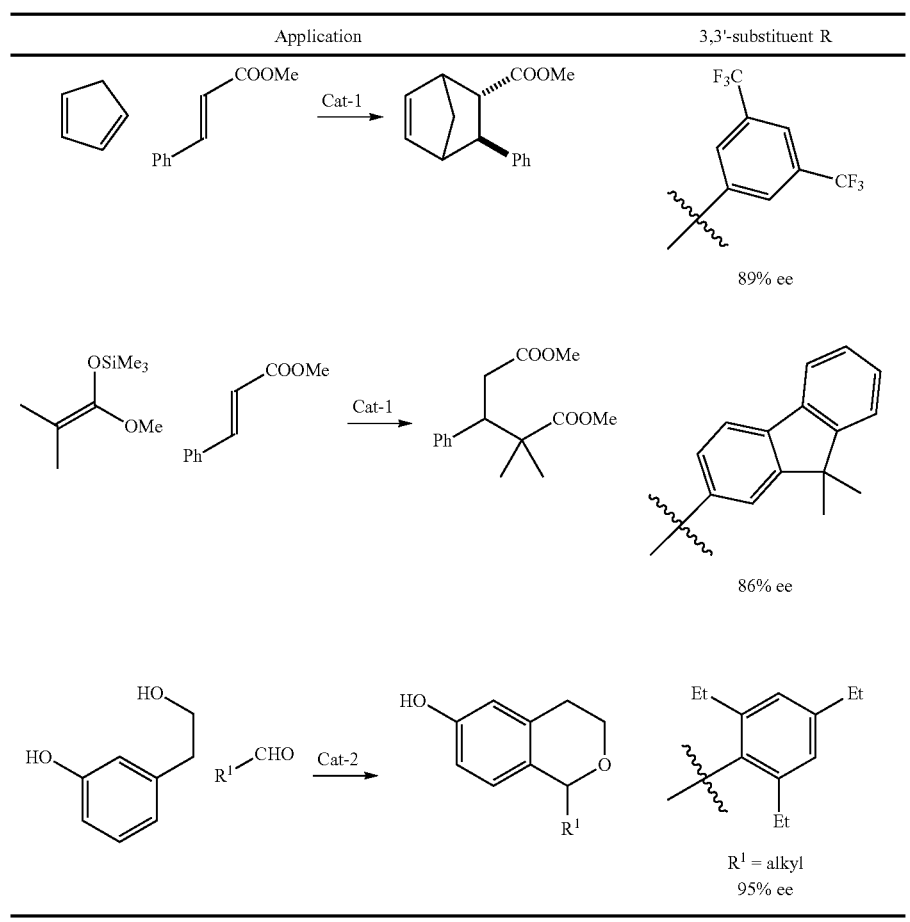
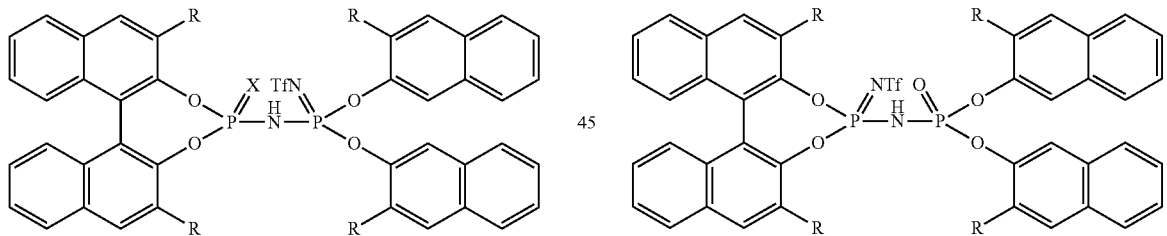
| Application | 3,3'-substituent R |
|---|---|
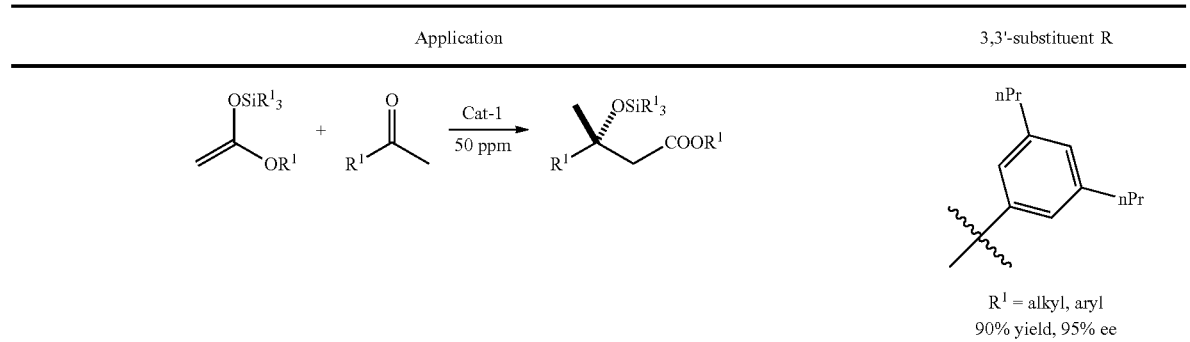

-continued
| Application | 3,3'-substituent R |
|---|---|
| 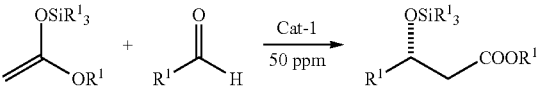 | 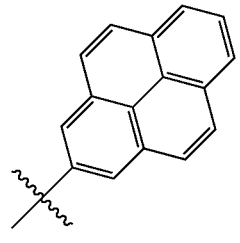<br>R¹ = alkyl<br>99% yield, 48% ee |
| 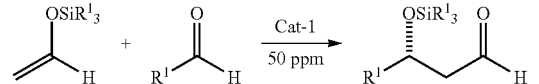 | 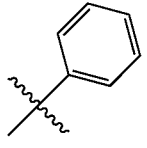<br>R¹ = alkyl, aryl<br>on going |
| 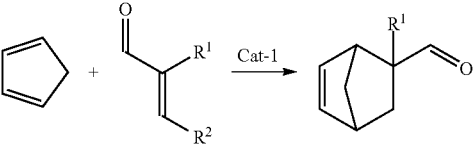 | 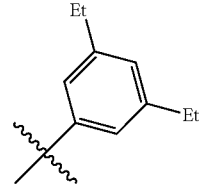<br>R¹ = alkyl, R² = H, Hal<br>92% yield, d.r. = 7:93<br>(endo:exo), 94% ee |
| 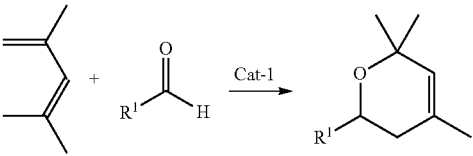 | 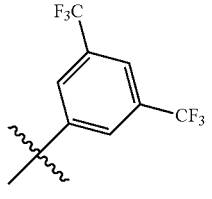<br>R¹ = aryl<br>93% ee |
| 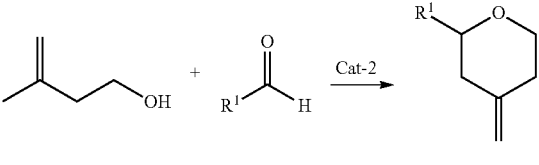 | 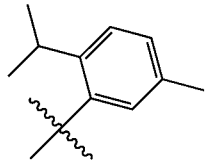<br>R¹ = alkyl<br>90% yield, 96% ee |
| 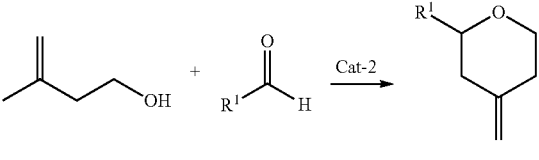 | 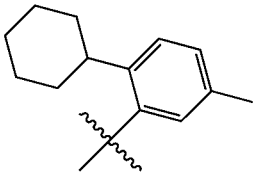<br>R¹ = aryl<br>86% yield, 93% ee |

-continued

| Application | 3,3'-substituent R |
|---|---|
| R¹-C(=CH₂)-CH₂CH₂-OH →[Cat-1] tetrahydrofuran with methyl and R¹ | 1-naphthyl<br>R¹ = aryl<br>61% ee |
| R²SH + norbornene-oxide with R¹ →[Cat-1] norbornyl-SR² with H | 5,6,7,8-tetrahydronaphthalen-2-yl<br>R¹ = alkyl, R₂ = aryl<br>46% ee |
| R²H + norbornene-oxide with R¹ →[Cat-1] norbornyl-R² with H | 1-naphthyl<br>R¹ = alkyl, R₂ = aryl<br>67% ee |
| R¹C(=O)R + allyl-M → R¹(OH)CH-CH₂-CH=CH₂ (Ph) | R^{1,2,3,4,5} = alkyl, aryl allylations |
| R¹C(=O)R + allenyl-M → R¹(OH)CH-CH₂-C≡CH (Ph) | propargylations |
| R¹C(=O)R + [H⁻] → R¹CH(OH) (Ph) | reductions |
| R¹-CH=CH₂ + R²-OH → R¹CH(OR²)CH₃ | hydroxyalkoxylation |
| R¹-CH=CH₂ + H-OH → R¹CH(OH)CH₃ | hydration |
| R¹-CH=CH₂ + R²-NH₂ → R¹CH(NHR²)CH₃ | hydroamination |
| | Friedel-Crafts reactions |
| R¹-CH=CH₂ + indole(NR₃) → 3-substituted indole with CH(R¹)CH₃ | |

-continued
| Application | 3,3'-substituent R |
|---|---|
| 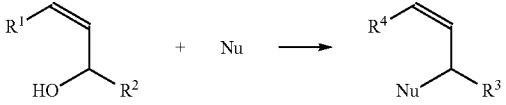 | nucleophilic substitution |
| 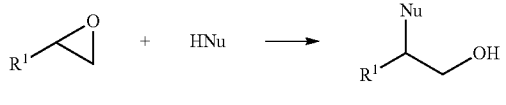 | epoxide openings |
| 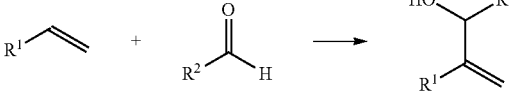 | Friedel-Crafts reactions |
| 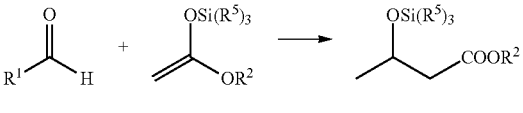 | Mukaiyama aldol reactions |
| 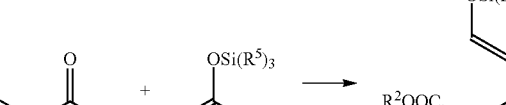 | Mukaiyama-Michael additions |
| 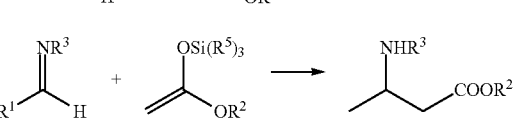 | indirect Mannich reactions |
| 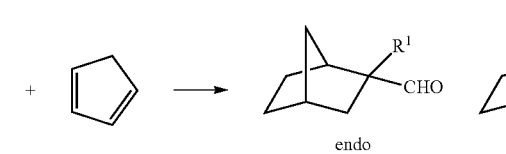 | Diels-Alder reactions |
| 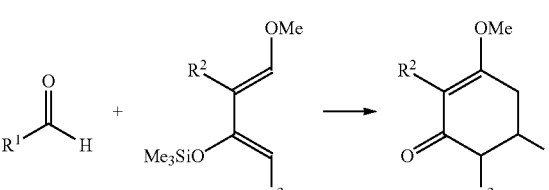 | $R^{1,2,3,4,5}$ = alkyl, aryl Hetero-Diels-Alder reactions |
| 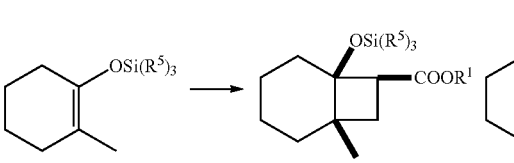 | cycloadditions |
| 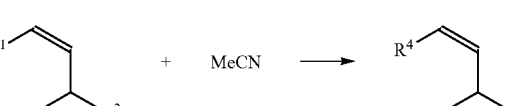 | Ritter reactions |
| 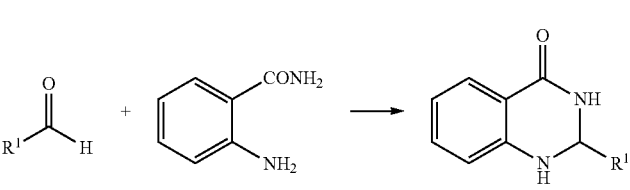 | aminalization |

| Application | 3,3'-substituent R |
|---|---|
| R¹CHO + HSCH₂CH₂SH → dithiolane-R¹ | thioacetalization |
| R²CH=CHCOOR¹ + indole → indole-CH(R²)CH₂COOR¹ | Michael additions |

As it can be seen from the above, the inventors have designed a novel class of Brønsted acids, in particular employing a $C_2$-symmetric phosphoramidimidate anion. The corresponding acid should have a flexible relative positioning of acid/basic pairs due to free P—N rotation. However, the inventor's catalyst design aimed at restricting the phosphoramidimidate moiety to a single N,N-syn conformation preferably between two identical BINOL subunits with bulky 3,3'-substituents. The inventors have found that the inclusion of two BINOL subunits will result in their interlocking due to sterically demanding 3,3'-substituents.

As a direct consequence, the BINOL subunits are unable to freely rotate and the resulting molecular structure possesses a very high rigidity. Importantly, such arrangement also resulted in the sterical blocking of the undesirable alternative Brønsted basic N-site. As the two BINOL subunits are identical, anion is $C_2$-symmetric, and has therefore only a single type of catalytically relevant Brønsted basic site. Consequently, the corresponding Brønsted acid possesses a single catalytically active bifunctional acid/base pair with a fixed geometry.

The inventors have thus shown here that the new Brønsted acids with extreme steric demand and chiral pockets reminiscent of those found in enzymes can overcome limitations and solve an important problem in organic synthesis. According to the invention, the concepts as described open the door for the development of asymmetric reactions which include small and/or loosely bound molecules, and will be widely applicable.

The invention is further illustrated by the following Examples.

EXAMPLES

Example 1—(S)-3,3'-bis(2,4,6-triisopropylphenyl)-[1,1'-binaphthalene]-2,2'-dinaphthyl-N,N'-bis((trifluoro-methyl)sulfonyl)phosphoramidimidate ((+)-4

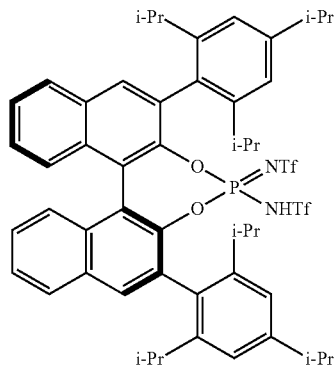

In a flame dried flask under Ar (S)-3,3'-bis(2,4,6-triisopropylphenyl)-[1,1'-binaphthalene]-2,2'-diol (0.10 g, 0.15 mmol, 1.0 equiv) was dissolved in freshly distilled pyridine (1.5 mL, 0.10 M), $PCl_5$ (63 mg, 0.30 mmol, 2.0 equiv) was added, and heated to 85° C. for 5 h. The reaction mixture was cooled to RT, $CF_3SO_2NH_2$ (0.27 g, 1.8 mmol, 12 equiv) and N,N-dimethylpyridin-4-amine (DMAP, 10 mg, 0.08 mmol, 0.5 equiv) were added, heated to 85° C. for 5 d, cooled to RT, and concentrated under reduced pressure. HCl (10 mL, 1.0 M) was added, extracted with $CH_2Cl_2$ (1×10 mL, 2×5 mL), washed with brine (10 mL), dried ($Na_2SO_4$), filtered, and concentrated under reduced pressure. Purification by CC (silica gel, $MeOH/CH_2Cl_2$ 0:1 to 1:49), acidification in $CH_2Cl_2$ (10 mL) with HCl (2×10 mL, 6.0 M) followed by drying under reduced pressure with MePh (3×3 mL) afforded compound (+)-4 (0.10 g, 66%) as a brown solid.

Example 2—((Trifluoromethyl)sulfonyl)phosphorimidoyl trichloride (P(NTf)Cl₃

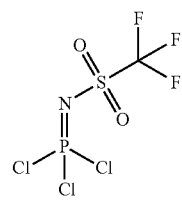

In a flame dried flask under Ar equipped with a magnetic stirring bar, which was connected to a cooling trap containing a 10 wt % NaOH(aq) solution and a vacuum pump, a mixture of $TfNH_2$ (3.0 g, 20 mmol, 1.0 equiv) and $PCl_5$ (5.5 g, 26 mmol, 1.3 equiv) was heated to 110° C. under Ar, until HCl evolution ceased. The liquid mixture was heated to 110° C. for 2 h at 300 mbar. The reaction was monitored by $^1H$, $^{19}F$, and $^{31}P$ NMR to ensure full consumption of $TfNH_2$. Purification of the obtained slightly yellow clear liquid by fractional distillation (0.07 mbar, b.p.=60° C., oil bath=90° C.) afforded $P(NTf)Cl_3$ (3.5 g, 61%) as a colorless clear oil.

Example 3—(S,S)—N-(2,6-diphenyldinaphtho[2,1-d:1',2'-f][1,3,2]dioxaphosphepin-4-yl)-N-methyl-2,6-di-phenyldinaptho[2,1-d: 1',2'-f][1,3,2]dioxa-phosphepin-4-amine (7dd

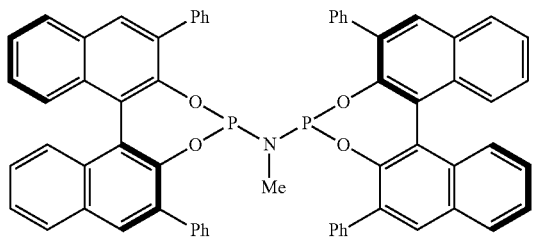

In a flame dried flask under Ar (S)-3,3'-diphenyl-[1,1'-binaphthalene]-2,2'-diol (0.32 g, 0.72 mmol, 2.0 equiv) was dissolved in MePh (2.4 mL, 0.30 M), (PCl$_2$)$_2$NMe (84 mg, 0.36 mmol, 1.0 equiv), Et$_3$N (0.44 g, 4.3 mmol, 12.0 equiv), then tetrazole (10 mg, 0.14 mmol, 0.4 equiv) in MeCN (0.32 mL, 0.50 M) was added, and stirred at RT for 24 h. The reaction mixture was diluted with MePh (2.4 mL), filtered, and concentrated under reduced pressure, which afforded crude compound 7dd as a colorless solid.

Example 4—(S,S)-4,4'-(methylazanediyl)bis(2,6-diphenyldinaphtho[2,1-d:1',2'f][1,3,2] ((trifluoromethyl)-sulfonyl)phosphoramidimidate ((+)-7d

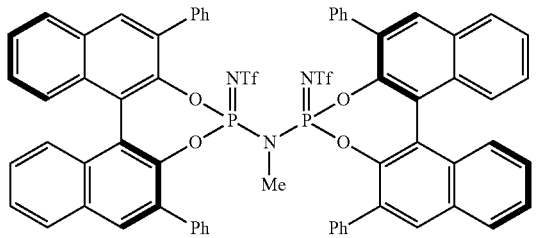

To an ice cold solution of NaN$_3$ (1.2 g, 18 mmol, 50 equiv) in H$_2$O (3.0 mL, 6.0 M) was added a solution of Tf$_2$O (1.0 g, 3.6 mmol, 10 equiv) in CH$_2$Cl$_2$ (3.0 mL, 1.2 M), stirred at 0° C. for 2 h. H$_2$O (0.5 mL) was added, the layers were separated and the aqueous layer was extracted with CH$_2$Cl$_2$ (2×1 mL). The combined organic layers were dried (Na$_2$SO$_4$), filtered, and added to (S,S)—N-(2,6-diphenyldinaphtho[2,1-d:1',2'-f][1,3,2]dioxaphosphepin-4-yl)-N-methyl-2,6-diphenyldinaphtho[2,1-d:1',2'-f][1,3,2]dioxa-phosphepin-4-amine (7dd) (0.35 g, 0.36 mmol, 1.0 equiv) at 0° C. under Ar. The reaction mixture was stirred at 0° C. for 2 h, warmed to RT (remove cooling bath), stirred at RT for 28 h, and concentrated under reduced pressure. Purification by CC (silica gel, MTBE/hexanes 1:9 to 1:4) afforded compound (+)-7d (0.31 g, 68%) as a colorless solid.

Example 5—(S,S)-3,3'-diphenyl-[1,1'-binaphthalene]-2,2'-dinaphthyl-N'—P,P-dinaphthoxy-N-((trifluoro-methyl)sulfonyl)phosphorimidoyl-N-((trifluoromethyl)sulfonyl) phosphoramidimidate ((+)-5d

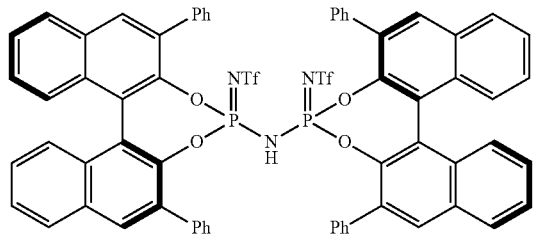

A mixture of (S,S)-4,4'-(methylazanediyl)bis(2,6-diphenyldinaphtho [2,1-d:1',2'-f][1,3,2]((trifluoro-methyl)-sulfonyl)-phosphoramidimidate (7d) (0.13 g, 0.10 mmol, 1.0 equiv) and n-Bu$_4$NI (TBAI, 0.56 g, 1.5 mmol, 15 equiv) in THF (2.0 mL, 0.05 M) was heated to 45° C. for 5 h. The reaction mixture was cooled to RT, diluted with MTBE (15 mL), washed with brine, NaHSO$_3$, HCl (6.0 M), NaHCO$_3$ (each 10 mL), dried (Na$_2$SO$_4$), filtered, and concentrated under reduced pressure. Purification by CC (silica gel, EtOAc/hexanes 3:7 to 2:3), acidification in CH$_2$Cl$_2$ (2 mL) with HCl (2 mL, 6.0 M), stirred at RT for 0.5 h, diluted with CH$_2$Cl$_2$ (8 mL) washed with HCl (2×10 mL, 6.0 M), followed by drying under reduced pressure with MePh (3×3 mL) afforded compound (+)-5d (0.10 g, 82%) as a colorless solid.

Example 6—(S,S)-3,3'-diphenyl-[1,1'-binaphthalene]-2,2'-dinaphthyl-N'—P,P-dinaphthoxy-N-((trifluoromethyl)sulfonyl)phosphorimidoyl-N-trifluoromethyl)sulfonyl)-phosphoramidimidate ((+)-5d

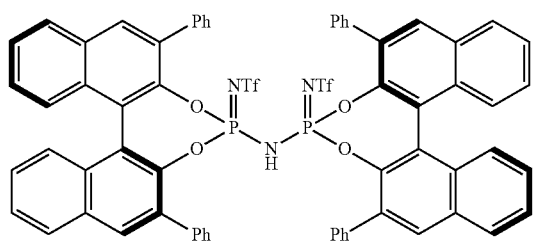

In a flame dried flask under Ar (S)-3,3'-diphenyl-[1,1'-binaphthalene]-2,2'-diol (2.02 g, 4.6 mmol, 2.0 equiv) was dissolved in MePh (15 mL, 0.30 M), P(NTf)Cl (1.37 g, 4.8 mmol, 2.1 equiv), then Et$_3$N (2.8 g, 27.6 mmol, 12.0 equiv) was added, and stirred at RT for 15 min. NH$_3$ (39 mg, 2.3 mmol, 1.0 equiv) in dioxane (6.6 mL, 0.35 M, titrated) was added, stirred at RT for 10 min, then heated to 100° C. for 3 d. The reaction mixture was cooled to RT, diluted with EtOAc (20 mL), washed with HCl (1.0 M) and brine (each 20 mL), dried (Na$_2$SO$_4$), filtered, and concentrated under reduced pressure. Purification by CC (silica gel, EtOAc/MePh 3:17), acidification in CH$_2$Cl$_2$ (2 mL) with HCl (2 mL, 6.0 M), stirred at RT for 0.5 h, diluted with CH$_2$Cl$_2$ (8 mL) washed with HCl (2×10 mL, 6.0 M), followed by drying under reduced pressure with MePh (3×3 mL) afforded compound (+)-5d (2.24 g, 78%) as a colorless solid.

Example 7—(R,R)—N-(2,6-di(naphthalene-2-yl)
dinaphtho[2,1-d:1',2'-f][1,3,2]dioxaphosphepin-4-
yl)-N-methyl-2,6-di(naphthalen-2-yl)dinaphtho[2,1-
d: 1',2'-f][1,3,2]dioxaphosphepin-4-amine (7bb

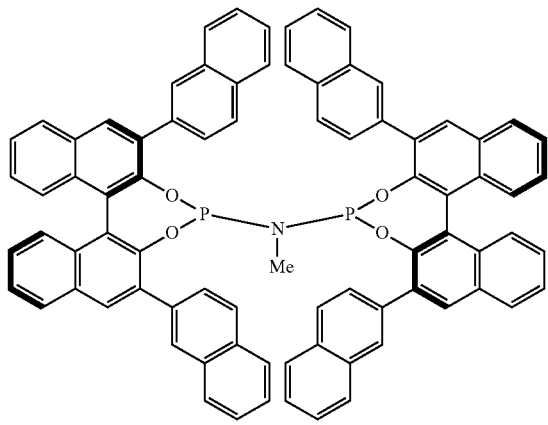

In a flame dried flask under Ar (R)-[2,2':4',1":3",2'"-quaternaphthalene]-2",3'-diol (0.10 g, 0.18 mmol, 2.0 equiv) was dissolved in MePh (0.45 mL, 0.40 M), (PCl$_2$)$_2$NMe (21 mg, 0.09 mmol, 1.0 equiv), then Et$_3$N (45 mg, 0.45 mmol, 5.0 equiv) was added, and stirred at RT for 3 d. The reaction mixture was diluted with MePh (0.45 mL), filtered, and concentrated under reduced pressure, which afforded crude compound 7bb as a colorless solid.

Example 8—(R,R)-4,4'-(methylazanediyl)bis(2,6-di(naphthalen-2-yl)dinaphtho[2,1-d:1',2'-f][1,3,2]((trifluoromethyl)sulfonyl)phosphoramidimidate ((−)-7b

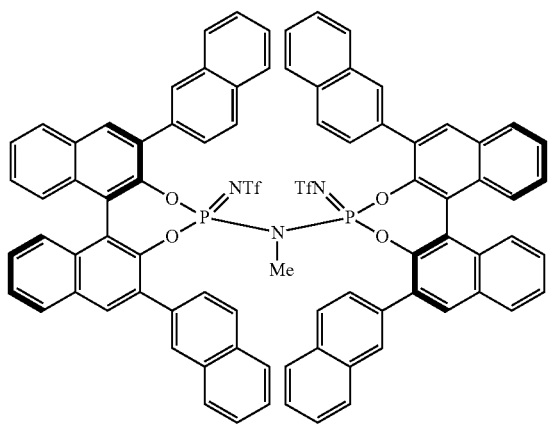

To an ice cold solution of NaN$_3$ (0.29 g, 4.5 mmol, 50 equiv) in H$_2$O (0.75 mL, 6.0 M) was added a solution of Tf$_2$O (0.25 g, 0.90 mmol, 10 equiv) in CH$_2$Cl$_2$ (0.75 mL, 1.2 M), stirred at 0° C. for 2 h. The layers were separated and the aqueous layer was extracted with CH$_2$Cl$_2$ (2×0.3 mL). The combined organic layers were dried (Na$_2$SO$_4$), filtered, and added to (R,R)—N-(2,6-di(naphthalen-2-yl)dinaphtho[2,1-d:1',2'-f][1,3,2]di-oxaphosphepin-4-yl)-N-methyl-2,6-di(naphthalen-2-yl)dinaphtho[2,1-d:1',2'-f][1,3,2]dioxaphosphepin-4-amine (7bb) (0.10 g, 0.09 mmol, 1.0 equiv) at 0° C. under Ar. The reaction mixture was stirred at 0° C. for 3 h, warmed to RT (remove cooling bath), stirred at RT for 5 d, and concentrated under reduced pressure. Purification by CC (silica gel, MTBE/hexanes 3:7, then silica gel, MePh) afforded compound (−)-7b (0.61 g, 46%) as a colorless solid.

Example 9—(R,R)-[2,2':4',1":3",2'"-quaternaphthalene]-2",3'-dinaphthoxy-N-(((trifluoromethyl)sulfonyl)-phosphorimidoyl-N-(((trifluoromethyl)sulfonyl)-phosphoramidimidate ((−)-5b

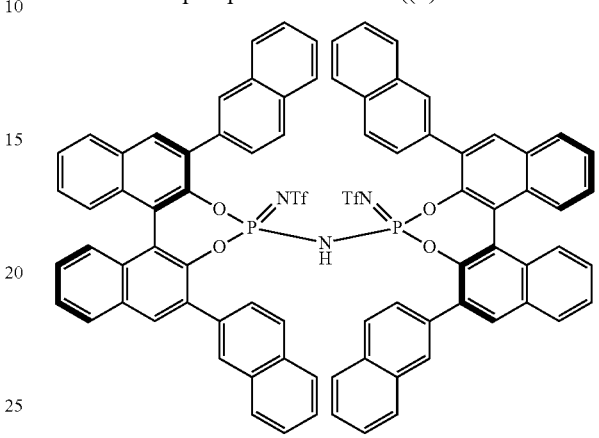

A mixture of (R,R)-4,4'-(methyl-azanediyl)bis(2,6-di(naphthalen-2-yl)dinaphtho[2,1-d: 1',2'-f][1,3,2] ((trifluoromethyl)sulfonyl)phosphoramidimidate ((−)-7b) (0.30 g, 0.21 mmol, 1.0 equiv) and n-Bu$_4$NI (TBAI, 1.2 g, 3.2 mmol, 15 equiv) in THF (4.2 mL, 0.05 M) was heated to 60° C. for 5.5 h. The reaction mixture was cooled to RT, diluted with MTBE (15 mL), filtered, washed with brine, Na$_2$SO$_3$, HCl (1.0 M, each 10 mL), dried (Na$_2$SO$_4$), filtered, and concentrated under reduced pressure. Purification by CC (silica gel, EtOAc/hexanes 1:3 to 3:7), acidification in CH$_2$Cl$_2$ (2 mL) with HCl (2 mL, 6.0 M), stirred at RT for 0.5 h, diluted with CH$_2$Cl$_2$ (8 mL) washed with HCl (2×10 mL, 6.0 M), followed by drying under reduced pressure with MePh (3×3 mL) afforded compound (−)-5b (0.18 g, 59%) as a colorless solid.

Example 10—(S,S)—N-(2,6-bis(3,5-dimethylphenyl)dinaphtho[2,1-d:1',2'-f][1,3,2]dioxaphosphepin-4-yl)-2,6-bis(3,5-dimethylphenyl)-N-methyldinaphtho[2,1-d:1',2'-f][1,3,2]dioxaphosphepin-4-amine (7cc

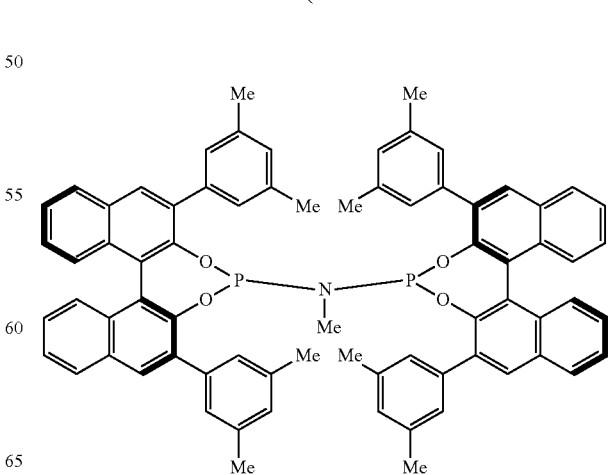

In a flame dried flask under Ar (S)-3,3'-bis(3,5-dimethylphenyl)-[1,1'-binaphthalene]-2,2'-diol (0.29 g, 0.60 mmol, 2.0 equiv) was dissolved in MePh (1.5 mL, 0.40 M), (PCl$_2$)$_2$NMe (70 mg, 0.30 mmol, 1.0 equiv), then Et$_3$N (0.15 g, 1.5 mmol, 5.0 equiv) was added, and stirred at RT for 25 h. The reaction mixture was diluted with MePh (1.5 mL), filtered, and concentrated under reduced pressure, which afforded crude compound 7cc as a colorless solid.

Example 11—(S,S)-4,4'-(methylazanediyl)bis(2,6-3,5-dimethylphenyl)dinaphtho[2,1-d:1',2'-f][1,3,2]((trifluoro-methyl)sulfonyl)phosphoramidimidate ((+)-7c

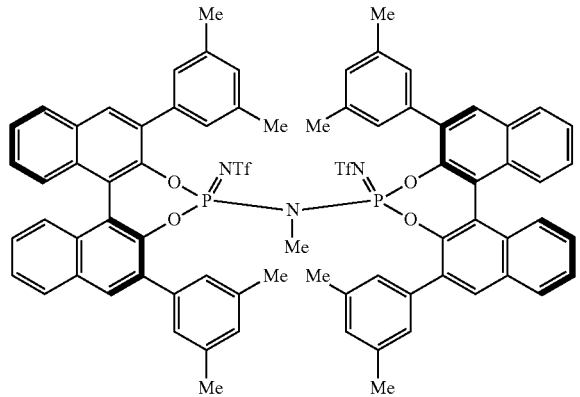

To an ice cold solution of NaN$_3$ (0.98 g, 15 mmol, 50 equiv) in H$_2$O (2.5 mL, 6.0 M) was added a solution of Tf$_2$O (0.85 g, 3.0 mmol, 10 equiv) in CH$_2$Cl$_2$ (2.5 mL, 1.2 M), stirred at 0° C. for 2 h. The layers were separated and the aqueous layer was extracted with CH$_2$Cl$_2$ (2×0.6 mL). The combined organic layers were dried (Na$_2$SO$_4$), filtered, and added to (S,S)—N-(2,6-bis(3,5-dimethylphenyl)dinaphtho[2,1-d:1',2'-f][1,3,2]dioxaphosphepin-4-yl)-2,6-bis(3,5-imethylphenyl)-N-methyldinaphtho[2,1-d: 1',2'-f][1,3,2]dioxaphosphepin-4-amine (7cc) (0.32 g, 0.30 mmol, 1.0 equiv) at 0° C. under Ar. The reaction mixture was stirred at 0° C. for 2 h, warmed to RT (remove cooling bath), stirred at RT for 13 h, and concentrated under reduced pressure. Purification by CC (silica gel, MePh/hexanes 7:3) and recrystallisation (CH$_2$Cl$_2$/pentane) afforded compound (+)-7c (0.19 g, 45%) as a colorless solid.

Example 12—(S,S)-3,3'-(2,6-bis(3,5-dimethylphenyl)-[1,1'-binaphthalene]-2,2'-dinaphthyl-N'—P,P-dinaphthoxy-N((trifluoromethyl)sulfonyl)phosphorimidoyl-N-((trifluoromethyl) sulfonyl)phosphoramidimidate ((+)-5c

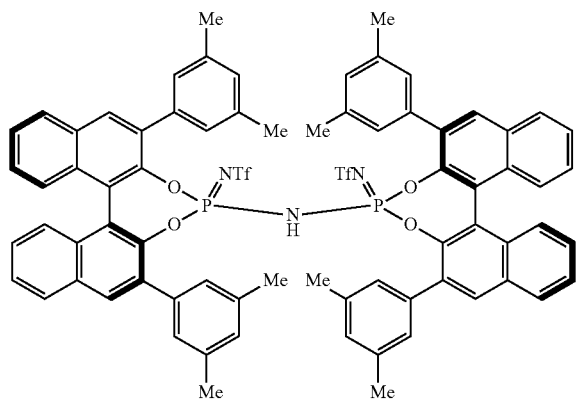

A mixture of (S,S)-4,4'-(methylazanediyl)bis(2,6-3,5-dimethylphenyl)dinaphtho[2,1-d: 1',2'-f][1,3,2]((trifluoromethyl)sulfonyl)phosphoramidimidate ((+)-7c) (0.10 g, 0.07 mmol, 1.0 equiv) and n-Bu$_4$NI (TBAI, 0.39 g, 1.1 mmol, 15 equiv) in THF (1.4 mL, 0.05 M) was heated to 45° C. for 2.5 h. The reaction mixture was cooled to RT, diluted with MTBE (10 mL), filtered, washed with brine, Na$_2$SO$_3$, HCl (1.0 M, each 10 mL), dried (Na$_2$SO$_4$), filtered, and concentrated under reduced pressure. Purification by CC (silica gel, EtOAc/hexanes 1:4), acidification in CH$_2$Cl$_2$ (2 mL) with HCl (2 mL, 6.0 M), stirred at RT for 0.5 h, diluted with CH$_2$Cl$_2$ (8 mL) washed with HCl (2×10 mL, 6.0 M), followed by drying under reduced pressure with MePh (3×3 mL) afforded compound (+)-5c (54 mg, 57%) as a colorless solid.

Example 13—(S)-4-azido-2,6-bis(2,4,6-triethylphenyl)dinaphtho[2,1-d:1',2'-f][1,3,2]dioxaphosphepine 4-oxide

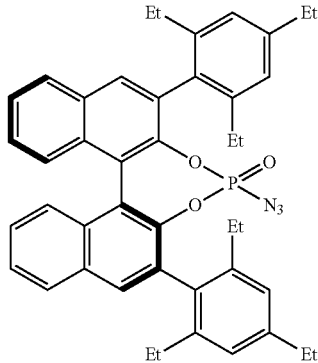

In a flame dried flask under Ar (S)-3,3'-bis(2,4,6-triethylphenyl)-[1,1'-binaphthalene]-2,2'-diol (0.61 g, 1.0 mmol, 1.0 equiv) was dissolved in freshly distilled pyridine (2.0 mL, 0.5 M), POCl$_3$ (0.38 g, 2.5 mmol, 2.5 equiv) was added, and heated to 85'C for 14 h. The reaction mixture was cooled to RT and concentrated under reduced pressure. The residue was suspended in CH$_2$Cl$_2$ (10 mL), filtered (silica gel), washed with HCl (10 mL, 1.0 M), dried (MgSO$_4$), filtered, and concentrated under reduced pressure. The crude mixture was dissolved in CH$_2$Cl$_2$ (3 mL), filtered (silica gel), and concentrated under reduced pressure. The colorless solid was dissolved in dry acetone and THF (each 0.7 mL, 0.70 M) under Ar, NaN$_3$ (22 mg, 0.34 mmol, 2.0 equiv), then TBAF (13 mg, 0.05 mmol, 0.05 equiv) was added, and stirred at RT for 2 d. The reaction mixture was diluted with CH$_2$Cl$_2$ (5 mL), filtered (silica gel), and concentrated under reduced pressure. Purification by CC (silica gel, EtOAc/hexanes 1:19) afforded compound (0.55 g, 80%) as a colorless solid.

Example 14 (S)—N-2,6-bis(2,4,6-triethylphenyl) dinaphtho[2,1-d:1',2'-f][1,3,2]dioxaphosphenin-4-yl)-1,1,1-trifluoromethanesulfonamide

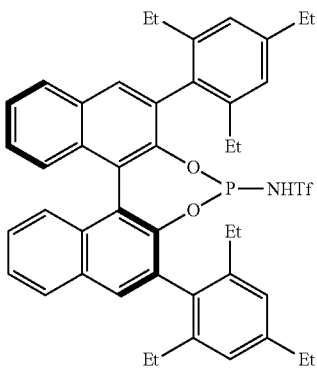

In a flame dried flask under Ar a mixture of $CF_3SO_2NH_2$ (9 mg, 0.06 mmol, 1.2 equiv) in THF (0.15 mL, 0.40 M) was cooled to 0° C., a solution of n-BuLi (4 mg, 0.06 mmol, 1.2 equiv) in hexanes (24 µL, 2.5 M) was added and stirred at 0'C for 3 h. In a second flame dried flask under Ar to a solution of (S)-3,3'-bis(2,4,6-triethylphenyl)-[1,1'-binaphthalene]-2,2'-diol (30 mg, 0.05 mmol, 1.0 equiv) in MePh (0.25 mL, 0.20 M) was added PCl (7 mg, 0.06 mmol, 1.1 equiv), then $Et_3N$ (17 mg, 0.17 mmol, 3.4 equiv), and stirred at RT for 3 h. The MePh mixture was filtered, then added to the ice cold THF mixture, warmed to RT (remove cooling bath), and stirred at RT for 4 h. The reaction mixture was filtered and concentrated under reduced pressure, which afforded crude compound (14 mg, 36%) as a colorless solid.

Example 15 (S,S)-3,3'-bis(2,4,6-triethylphenyl)-[1,1'-binaphthalene]-2,2'-dinaphthyl-1,1,1-trifluoromethanesulfonamide-amido-phosphoranylidene-phosphoamidate

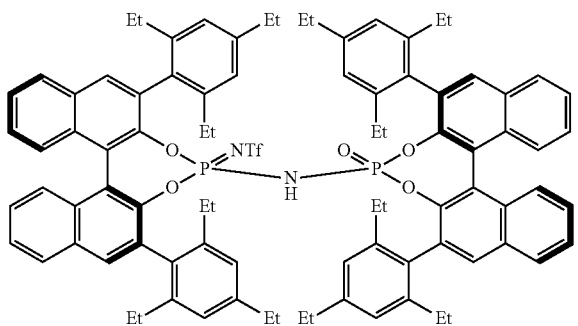

In a flame dried flask under Ar to a crude mixture of (S)—N-2,6-bis(2,4,6-triethylphenyl)-dinaphtho[2,1-d:1',2'-f][1,3,2]dioxaphosphepin-4-yl)-1,1,1-trifluoromethanesulfonamide (0.71 g, 0.90 mmol, 1.4 equiv, not isolated as described for analytical data) in MePh/THF (13 mL, 0.05 M) was added (S)-4-azido-2,6-bis(2,4,6-triethylphenyl)-dinaphtho[2,1-d: 1',2'-f][1,3,2]dioxaphosphepine 4-oxide (0.45 g, 0.64 mmol, 1.0 equiv). The reaction mixture was stirred at 50° C. for 3 d, then heated to 100'C for 23 h, cooled to RT, diluted with MTBE (10 mL), filtered, washed with HCl (1.0 M), brine (each 10 mL), dried ($Na_2SO_4$), filtered, and concentrated under reduced pressure. Purification by CC (silica gel, EtOAc/hexanes 1:9 to 3:17), acidification in $CH_2Cl_2$ (2 mL) with HCl (2 mL, 6.0 M), stirred at RT for 0.5 h, diluted with $CH_2Cl_2$ (8 mL) washed with HCl (2×10 mL, 6.0 M), followed by drying under reduced pressure with MePh (3×3 mL) afforded compound (0.71 g, 76%) as a colorless solid.

Catalytic Tests

As referred to in Scheme 3, some catalytic reactions are generally explained as follows.

General Catalytic Asymmetric Allylation of Aldehydes and Acetals with Allyltrimethylsilane:

In a Schlenk tube under an Ar atmosphere the catalyst (1 to 5 mol %) and the aldehyde (0.03 mmol, 1.0 equiv) in the respective solvent (respective volume) was cooled to the respective temperature. After 20 min, allyltrimethylsilane (18 mg, 0.16 mmol, 5.2 equiv) was added dropwise to the stirred solution, and the sealed Schlenk tube was either placed in a pre-cooled cryostat (−57° C.) or in a Dewar filled with dry ice and some acetone (−78° C.). Upon consumption of all aldehyde/acetal monitored by TLC or GC analysis, aqueous HCl (0.2 mL, 1.0 M) was added to the stirred reaction mixture, which was then warmed to room temperature and stirred vigorously for 2 h (only for aldehydes). The mixture was diluted with $Et_2O$ (0.2 mL) and basified with saturated aqueous $NaHCO_3$ (0.5 mL). The layers were separated and the aqueous layer was extracted with $Et_2O$ (3×0.5 mL). The combined organic layers were dried ($Na_2SO_4$), filtered and concentrated under reduced pressure (>100 mbar). Purification by CC (silica gel) afforded the corresponding homoallylic alcohol or ether.

General Catalytic Asymmetric Diels-Alder Reaction and Mukaiyama Additions:

In a Schlenk tube under an Ar atmosphere the catalyst (1 mol %) and the ester (0.02 mmol, 1.0 equiv) in the respective solvent (respective volume) was cooled to the respective temperature. SKA (0.02 mmol, 0.05 or 1.0 equiv) was added (then the corresponding diene (0.2 mmol, 10.0 equiv)) to the stirred solution. Upon consumption of all ester monitored by TLC or GC analysis, aqueous HCl (0.1 mL, 1.0 M) was added to the stirred reaction mixture, which was then warmed to room temperature and stirred vigorously for 2 h. The mixture was diluted with $Et_2O$ (0.2 mL) and the layers were separated. The aqueous layer was extracted with $Et_2O$ (3×0.5 mL). The combined organic layers were dried ($Na_2SO_4$), filtered and concentrated under reduced pressure. Purification by CC (silica gel) afforded the corresponding bicyclic ester or diester.

General Catalytic Asymmetric Procedure for Oxa-Pictet-Spengler Reactions:

A flask (2 mL, stirring bar) was charged with corresponding aromatic alcohol (0.02 mmol), catalyst (5 mol %), and activated molecular sieves (5 Å, 10 mg). The vial was flushed with argon and sealed. Dry solvent (0.1 mL) was added and adjusted to the respective temperature, then the aldehyde (0.05 mmol) was added. Upon consumption of all aldehyde/acetal monitored by TLC or GC analysis, the reaction mixture was basified with $Et_3N$, filtered and concentrated under reduced pressure. Purification by CC (silica gel) afforded the corresponding ether.

General Catalytic Asymmetric Procedure for Prins-Cyclization Reactions:

Unless specified otherwise, aldehyde (0.12 mmol) and 3-methyl-3-buten-1-ol (0.10 mmol) were added to the mixture of catalyst (0.005 mmol, 5 mol %) and 50 mg 5 Å molecular sieves in anhydrous solvent (0.1 M). The vial was flushed with argon and sealed. Upon consumption of all aldehyde/acetal, the reaction mixture was basified with Et3N, filtered and concentrated under reduced pressure. Purification by CC (silica gel) afforded the corresponding ether.

The invention claimed is:

1. A chiral phosphoramidimidate having the general formula (I):

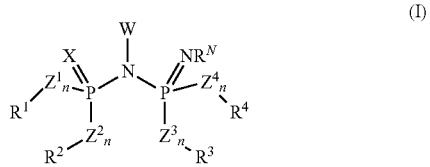

or a tautomeric and/or ionic form thereof,
wherein:

X represents O, S, Se or $NR^N$, $Z^1$ to $Z^4$ are, independently from each other, the same or different and represent O, S, Se or $NR^N$, n stands for 0 or 1, W is selected from hydrogen, halogen, a metal selected from Li, Na, K, Rb, Cs, Be, Mg, Ca, Sr, Ba, Sc, Ti, V, Cr, Mn, Fe, Co, Ni, Cu, Zn, Y, Zr, Mo, Ru, Rh, Pd, Ag, W, Re, Os, Ir, Pt, Au, Al, Pb, La, Sm, Eu, Yb, or U, or a cationic organic group, or a substituted silicon —$SiR'R''R'''$, wherein $R'$, $R''$ and $R'''$ are the same or different and each stands for hydrogen, halogen, $C_1$ to $C_{20}$ straight chain, branched chain or cyclic aliphatic hydrocarbon, $C_3$-$C_8$-heterocycloalkyl, $C_6$ to $C_{20}$ aromatic hydrocarbon or a partially arene-hydrogenated form thereof, aryl-($C_1$-$C_6$)-alkyl, or heteroaryl-($C_1$-$C_6$)-alkyl, each said aliphatic hydrocarbon, heterocycloalkyl, aromatic hydrocarbon or partially arene-hydrogenated form thereof, arylalkyl, or heteroaryl-alkyl optionally being substituted on a hydrocarbyl portion thereof by one or more groups selected from $C_1$ to $C_{20}$ straight chain, branched chain or cyclic aliphatic hydrocarbons, optionally having one or more unsaturated bonds, $C_3$-$C_8$-heterocycloalkyl, $C_6$ to $C_{20}$ aromatic hydrocarbons or partially arene-hydrogenated forms thereof, aryl-($C_1$-$C_6$)-alkyl, heteroaryl-($C_1$-$C_6$)-alkyl, or heterosubstituents, $R^1$, $R^2$, $R^3$ and $R^4$ are, independently from each other, the same or different and are each an aliphatic, heteroaliphatic, aromatic or heteroaromatic hydrocarbon group, each optionally being further substituted by one or more heterosubstituents, or aliphatic, heteroaliphatic, aromatic or heteroaromatic hydrocarbon groups, whereby $R^1$ may form a ring system with any one of $R^2$, $R^3$ or $R^4$ and the other two of $R^2$, $R^3$ or $R^4$ may form a ring system with each other;

and $R^N$ is an electron withdrawing group, being the same or different on each N and being selected from:

i. -alkyl, —CO-alkyl, —(CO)—O-alkyl, sulfinyl alkyl, sulfonyl alkyl, or —(P=O)-dialkyl, wherein alkyl is a $C_1$ to $C_{20}$ straight chain, branched chain or cyclic aliphatic hydrocarbon having at least one halogen substituent on the alkyl residue;

ii. aryl, —CO-aryl, —(CO)—O-aryl, sulfinyl aryl, sulfonyl aryl, or —(P=O)-diaryl, wherein aryl is a $C_6$ to $C_{18}$ aromatic hydrocarbon, optionally having at least one halogen substituent on the aryl residue;

iii. heteroaryl, —CO-heteroaryl, —(CO)—O-heteroaryl, sulfinyl heteroaryl, sulfonyl heteroaryl, or —(P=O)-di-heteroaryl, wherein heteroaryl is a $C_2$ to $C_{20}$ aromatic hydrocarbon having one or more heteroatoms, and wherein the heteroaryl optionally has at least one halogen substituent on the heteroaryl residue;

or in the case that X represents $NR^N$, one $R^N$ may be bridging the two P=N— units to form a ring represented by formula:

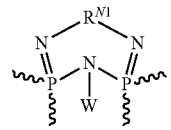

wherein $R^{N1}$ represents —(SO)—, —(SO$_2$)— or —($NR^{N2}$)— wherein $R^{N2}$ is an electron withdrawing group being selected from -alkyl, —CO-alkyl, or —(CO)—O-alkyl, wherein alkyl is a $C_1$ to $C_{20}$ straight chain, branched chain or cyclic aliphatic hydrocarbon having at least one halogen substituent on the alkyl residue.

2. A chiral phosphoramidimidate according to claim 1, wherein in formula (I), $Z^1$ to $Z^4$ independently represent O, S or $NR^N$, n is 1, and X, $R^1$ to $R^4$, $R^N$ as well as W are as defined in claim 1, as represented by formula (II):

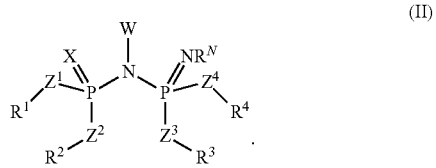

3. A chiral phosphoramidimidate according to claim 1, wherein at least one moiety

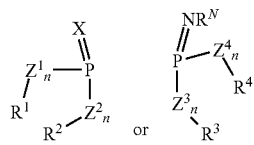

forms a five to ten-membered ring structure, whereby $R^1$ and $R^2$ together are forming a ring system with $Z^1$ and $Z^2$ and/or whereby $R^3$ and $R^4$ together are forming a ring system with $Z^3$ and $Z^4$, wherein $R^1$ to $R^4$, $Z^1$ to $Z^4$, n, $R^N$, and X are as defined in claim 1.

4. A chiral phosphoramidimidate according to claim 1, which has the formula (IIIa):

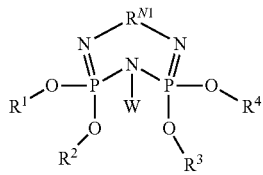

(IIIa)

wherein $R^1$ to $R^4$ and W are as defined in claim 1, and wherein $R^{N1}$ represents —(SO)—, —(SO$_2$)— or —(NR$^{N2}$)— wherein $R^{N2}$ is an electron withdrawing group being selected from -alkyl, —CO-alkyl, or —(CO)—O-alkyl, wherein alkyl is a $C_1$ to $C_{20}$ straight chain, branched chain or cyclic aliphatic hydrocarbon having at least one halogen substituent on the alkyl residue.

5. A chiral phosphoramidimidate according to claim 1, wherein, in formula (I), $Z^1$ to $Z^4$ represent O, and $R^1$ to $R^4$, X as well as W are as defined in claim 1, and n=1, said phosphoramidimidate having the formula (IIIb):

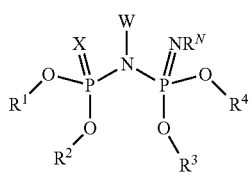

(IIIb)

wherein $R^N$ is an electron withdrawing group as defined in claim 1.

6. A chiral phosphoramidimidate according to claim 1, wherein ($R^1$, $R^2$, $Z^1_n$ and $Z^2_n$) and ($R^3$, $R^4$, $Z^3_n$ and $Z^4_n$), respectively are as defined in claim 1 and each form a ring structure which may be the same or different and is derived from a bridged, optionally dimeric, aromatic structure selected from biphenyl optionally substituted, BINOL, TADDOL, VAPOL, SPINOL, 1,1'-binaphthalene, 1,1'-bianthracene, 1,1-biphenanthrene, or a partially arene-hydrogenated form of said aromatic ring structures including 8H-BINOL, each of said ring systems optionally being substituted by one or more substituents which may be the same or different on each position and are each selected from hydrogen, heterosubstituents, $C_1$ to $C_{20}$ straight chain, branched chain or cyclic aliphatic hydrocarbon, optionally having one or more unsaturated bonds, $C_3$-$C_8$-heterocycloalkyl, $C_6$ to $C_{20}$ aromatic hydrocarbon or a partially arene-hydrogenated form thereof, aryl-($C_1$-$C_6$)-alkyl, or heteroaryl-($C_1$-$C_6$)-alkyl each said aliphatic hydrocarbon, heterocycloalkyl, aromatic hydrocarbon or partially arene-hydrogenated form thereof, arylalkyl, or heteroaryl-alkyl optionally being substituted by one or more groups selected from $C_1$ to $C_{20}$ straight chain, branched chain or cyclic aliphatic hydrocarbons, optionally having one or more unsaturated bonds, $C_3$-$C_8$-heterocycloalkyl, $C_6$ to $C_{20}$ aromatic hydrocarbons and partially arene-hydrogenated forms thereof, aryl-($C_1$-$C_6$)-alkyl, heteroaryl-($C_1$-$C_6$)-alkyl, or a heterosubstituent,
wherein n, $R^N$, X and W are as defined in claim 1,
or a tautomeric and/or ionic form thereof,
wherein the ring structure formed by ($R^1$, $R^2$, $Z^1$ and $Z^2$) and ($R^3$, $R^4$, $Z^3$ and $Z^4$) may be the same or different and is chiral.

7. A chiral phosphoramidimidate according to claim 6, wherein the compound of formula (I) has the formula (IV):

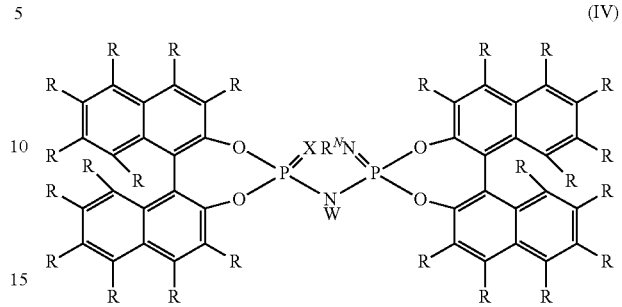

(IV)

wherein in said formula (IV), the substituent R may be same or different on each position and is each selected from hydrogen, heterosubstituents, $C_1$ to $C_{20}$ straight chain, branched chain or cyclic aliphatic hydrocarbons, optionally having one or more unsaturated bonds, $C_3$-$C_8$-heterocycloalkyl, $C_6$ to $C_{20}$ aromatic hydrocarbons and partially arene-hydrogenated forms thereof, aryl-($C_1$-$C_6$)-alkyl, or heteroaryl-($C_1$-$C_6$)-alkyl, and each said aliphatic hydrocarbon, heterocycloalkyl, aromatic hydrocarbon or partially arene-hydrogenated form thereof, arylalkyl, or heteroaryl-alkyl optionally being substituted by one or more groups selected from $C_1$ to $C_{20}$ straight chain, branched chain or cyclic aliphatic hydrocarbons, optionally having one or more unsaturated bonds, $C_3$-$C_8$-heterocycloalkyl, $C_6$ to $C_{20}$ aromatic hydrocarbons and partially arene-hydrogenated forms thereof, aryl-($C_1$-$C_6$)-alkyl, heteroaryl-($C_1$-$C_6$)-alkyl, or a heterosubstituent, and $R^N$, X and W are as defined in claim 1, or a tautomeric and/or ionic form thereof.

8. A chiral phosphoramidimidate according to claim 1, wherein at least one of said ring structures optionally formed by ($R^1$, $R^2$, $Z^1$ and $Z^2$) and ($R^3$, $R^4$, $Z^3$ and $Z^4$) respectively is chiral.

9. A chiral phosphoramidimidate according to claim 1, wherein the ring structures optionally formed by ($R^1$, $R^2$, $Z^1$ and $Z^2$) and ($R^3$, $R^4$, $Z^3$ and $Z^4$), respectively, are identical.

10. A chiral phosphoramidimidate according to claim 1, which has the following formula (IVa):

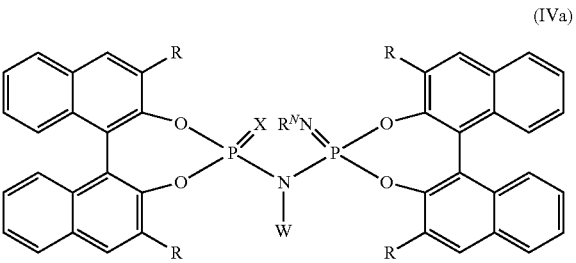

(IVa)

wherein the substituent R may be the same or different on each position and is each selected from hydrogen, heterosubstituents, $C_1$ to $C_{20}$ straight chain, branched chain or cyclic aliphatic hydrocarbons, optionally having one or more unsaturated bonds, $C_3$-$C_8$-heterocycloalkyl, $C_6$ to $C_{20}$ aromatic hydrocarbons and partially arene-hydrogenated forms thereof, aryl-($C_1$-$C_6$)-alkyl, or heteroaryl-($C_1$-$C_6$)-alkyl, and each said aliphatic hydrocarbon, heterocycloalkyl, aromatic hydrocarbon or partially arene-hydrogenated form thereof, arylalkyl, or heteroaryl-alkyl optionally being substituted by one or more groups selected from $C_1$ to $C_{20}$ straight chain, branched chain or cyclic aliphatic hydrocarbons, optionally having one or more unsaturated bonds, $C_3$-$C_8$-heterocycloalkyl, $C_6$ to $C_{20}$ aromatic hydrocarbons and partially arene-hydrogenated forms thereof, aryl-($C_1$-$C_6$)-alkyl, heteroaryl-($C_1$-$C_6$)-alkyl, or a heterosubstituent, $R^N$, X and W have the meaning as defined in claim 1, or a tautomeric and/or ionic form thereof.

11. A chiral phosphoramidimidate according to claim 1, which has the following formula (IVb):

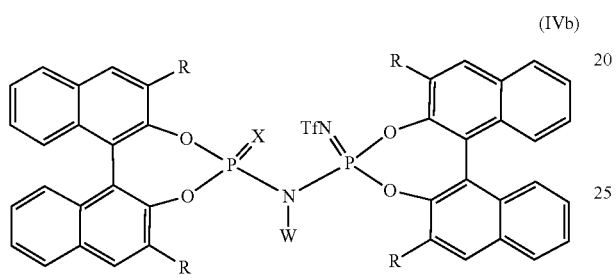

(IVb)

wherein the substituent R may be the same or different on each position and each is selected from hydrogen, heterosubstituents, $C_1$ to $C_{20}$ straight chain, branched chain or cyclic aliphatic hydrocarbons, optionally having one or more unsaturated bonds, $C_3$-$C_8$-heterocycloalkyl, $C_6$ to $C_{20}$ aromatic hydrocarbons and partially arene-hydrogenated forms thereof, aryl-($C_1$-$C_6$)-alkyl, or heteroaryl-($C_1$-$C_6$)-alkyl, and each said aliphatic hydrocarbon, heterocycloalkyl, aromatic hydrocarbon or partially arene-hydrogenated form thereof, arylalkyl, or heteroaryl-alkyl optionally being substituted by one or more groups selected from $C_1$ to $C_{20}$ straight chain, branched chain or cyclic aliphatic hydrocarbons, optionally having one or more unsaturated bonds, $C_3$-$C_8$-heterocycloalkyl, $C_6$ to $C_{20}$ aromatic hydrocarbons and partially arene-hydrogenated forms thereof, aryl-($C_1$-$C_6$)-alkyl, heteroaryl-($C_1$-$C_6$)-alkyl, or a heterosubstituent;

X represents O, S, Se or $NR^N$, and W is as defined in claim 1;

or a tautomeric and/or ionic form thereof.

12. A chiral phosphoramidimidate according to claim 1, wherein W is hydrogen.

13. Method of using a chiral phosphoramidimidate of the formula (I) as defined in claim 1 wherein W is H as a chiral Brønsted acid catalyst in organic synthesis.

14. Method of using a chiral phosphoramidimidate of the formula (I) as defined in claim 1 wherein W is a metal or the phosphoramidimidate of formula (I) is anionic as a chiral anion in phase-transfer catalysis, or as chiral anion for organic salts, metal salts or metal complexes as catalysts.

15. Method of using a chiral phosphoramidimidate of the formula (I) as defined in claim 1 as a chiral catalyst in a synthetic reaction in organic synthesis, wherein the synthetic reaction is selected from aldol reactions, vinylogous aldol reactions, Mukaiyama aldol reactions, vinylogous Mukaiyama aldol reactions, Mukaiyama-Michael reactions, Michael additions, Mannich reactions, TMSCN additions onto aldehydes, TMSCN additions onto ketones, TMSCN additions onto imines, esterifications, etherifications, pinacol rearrangements, acetalizations, transacetalization, spiroacetalization, cycloadditions, hydroaminations, hydroalkoxylation, hydrations, haloalkoxylation, haloamination, olefin activations in general including ene-reactions and Prins reactions, Friedel-Crafts reactions, epoxide openings, Ritter reactions, nucleophilic substitutions of alcohols, asymmetric ring openings, asymmetric reductions, transfer hydrogenations, alkyne additions, imine additions, Strecker reactions, allylations, propargylations, reductions, epoxidations, olefin metathesis, isomerizations, Diels-Alder reactions, hetero-Diels-Alder reactions, aminalizations, iminium catalysis and enamine catalysis.

16. A chiral phosphoramidimidate having the general formula (I):

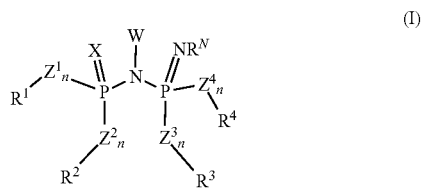

(I)

or a tautomeric and/or ionic form thereof, wherein:

X represents O, S, Se or $NR^N$, $Z^1$ to $Z^4$ may be, independently from each other, the same or different and represent O, S, Se and $NR^N$, n stands for 0 or 1, W is selected from hydrogen, halogen, a metal selected from Li, Na, K, Rb, Cs, Be, Mg, Ca, Sr, Ba, Sc, Ti, V, Cr, Mn, Fe, Co, Ni, Cu, Zn, Y, Zr, Mo, Ru, Rh, Pd, Ag, W, Re, Os, Ir, Pt, Au, Al, Pb, La, Sm, Eu, Yb, or U, or a cationic organic group, or a substituted silicon —$SiR^I R^{II} R^{III}$, wherein $R^I$, $R^{II}$ and $R^{III}$ are the same or different and each stands for hydrogen, halogen, $C_1$ to $C_{20}$ straight chain, branched chain or cyclic aliphatic hydrocarbon, $C_3$-$C_8$-heterocycloalkyl, $C_6$ to $C_{20}$ aromatic hydrocarbon or a partially arene-hydrogenated form thereof, aryl-($C_1$-$C_6$)-alkyl, or heteroaryl-($C_1$-$C_6$)-alkyl, each said aliphatic hydrocarbon, heterocycloalkyl, aromatic hydrocarbon or partially arene-hydrogenated form thereof, arylalkyl, or heteroaryl-alkyl optionally being substituted on a hydrocarbyl portion thereof by one or more groups selected from $C_1$ to $C_{20}$ straight chain, branched chain or cyclic aliphatic hydrocarbons, optionally having one or more unsaturated bonds, $C_3$-$C_8$-heterocycloalkyl, $C_6$ to $C_{20}$ aromatic hydrocarbons or partially arene-hydrogenated forms thereof, aryl-($C_1$-$C_6$)-alkyl, heteroaryl-($C_1$-$C_6$)-alkyl, or heterosubstituents, $R^1$, $R^2$, $R^3$ and $R^4$ may be, independently from each other, the same or different and are each an aliphatic, heteroaliphatic, aromatic or heteroaromatic hydrocarbon group, each optionally being further substituted by one or more heterosubstituents, or aliphatic, heteroaliphatic, aromatic or heteroaromatic hydrocarbon groups, whereby R¹ may form a ring system with any one of $R^2$, $R^3$ or $R^4$ and the other two of $R^2$, $R^3$ or $R^4$ may form a ring system with each other;

and $R^N$ is an electron withdrawing group, being the same or different on each N and being selected from:
i. -alkyl, —CO-alkyl, —(CO)—O-alkyl, sulfinyl alkyl, sulfonyl alkyl, or —(P=O)-dialkyl, wherein alkyl is a $C_1$ to $C_{20}$ straight chain, branched chain or cyclic aliphatic hydrocarbon having at least one halogen substituent on the alkyl residue;
ii. aryl, —CO-aryl, —(CO)—O-aryl, sulfinyl aryl, sulfonyl aryl, or —(P=O)-diaryl, wherein aryl is a $C_6$ to $C_{18}$ aromatic hydrocarbon, optionally having at least one halogen substituent on the aryl residue;
iii. heteroaryl, —CO-heteroaryl, —(CO)—O-heteroaryl, sulfinyl heteroaryl, sulfonyl heteroaryl, or —(P=O)-di-heteroaryl, wherein heteroaryl is a $C_2$ to $C_{20}$ aromatic hydrocarbon having one or more heteroatoms, and wherein the heteroaryl optionally has at least one halogen substituent on the heteroaryl residue;

or in the case that X represents $NR^N$, one $R^N$ may be bridging the two P=N— units to form a ring represented by formula:

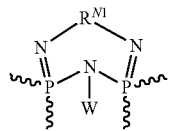

wherein $R^{N1}$ represents —(SO)—, —(SO$_2$)— or —(NR$^{N2}$)— wherein $R^{N2}$ is an electron withdrawing group being selected from -alkyl, —CO-alkyl, or —(CO)—O-alkyl, wherein alkyl is a $C_1$ to $C_{20}$ straight chain, branched chain or cyclic aliphatic hydrocarbon having at least one halogen substituent on the alkyl residue.

17. A chiral phosphoramidimidate having the general formula (I):

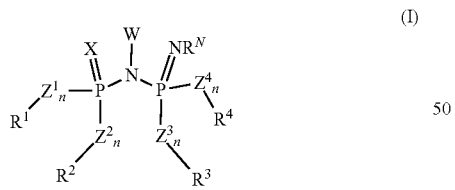

or a tautomeric and/or ionic form thereof,
wherein:
X represents O, S, Se or $NR^N$,
$Z^1$ to $Z^4$ are, independently from each other, the same or different and represent O, S, Se or $NR^N$,
n stands for 0 or 1,
W is selected from hydrogen, halogen, a metal selected from Li, Na, K, Rb, Cs, Be, Mg, Ca, Sr, Ba, Sc, Ti, V, Cr, Mn, Fe, Co, Ni, Cu, Zn, Y, Zr, Mo, Ru, Rh, Pd, Ag, W, Re, Os, Ir, Pt, Au, Al, Pb, La, Sm, Eu, Yb, or U, or a cationic organic group, or a substituted silicon —SiR'R''R''', wherein R', R'' and R''' are the same or different and each stands for hydrogen, halogen, $C_1$ to $C_{20}$ straight chain, branched chain or cyclic aliphatic hydrocarbon, $C_3$-$C_8$-heterocycloalkyl, $C_6$ to $C_{20}$ aromatic hydrocarbon or a partially arene-hydrogenated form thereof, aryl-($C_1$-$C_6$)-alkyl, or heteroaryl-($C_1$-$C_6$)-alkyl, each said aliphatic hydrocarbon, heterocycloalkyl, aromatic hydrocarbon or partially arene-hydrogenated form thereof, arylalkyl, or heteroaryl-alkyl optionally being substituted on a hydrocarbyl portion thereof by one or more groups selected from $C_1$ to $C_{20}$ straight chain, branched chain or cyclic aliphatic hydrocarbons, optionally having one or more unsaturated bonds, $C_3$-$C_8$-heterocycloalkyl, $C_6$ to $C_{20}$ aromatic hydrocarbons or partially arene-hydrogenated forms thereof, aryl-($C_1$-$C_6$)-alkyl, heteroaryl-($C_1$-$C_6$)-alkyl, or heterosubstituents, $R^1$, $R^2$, $R^3$ and $R^4$ are, independently from each other, the same or different and are each an aliphatic, heteroaliphatic, aromatic or heteroaromatic hydrocarbon group, each optionally being further substituted by one or more heterosubstituents, or aliphatic, heteroaliphatic, aromatic or heteroaromatic hydrocarbon groups, whereby $R^1$ may form a ring system with any one of $R^2$, $R^3$ or $R^4$ and the other two of $R^2$, $R^3$ or $R^4$ may form a ring system with each other;

and $R^N$ is an electron withdrawing group, being the same or different on each N and being selected from:
i. sulfinyl alkyl, or sulfonyl alkyl, wherein alkyl is a $C_1$ to $C_{20}$ straight chain, branched chain or cyclic aliphatic hydrocarbon having at least one halogen substituent on the alkyl residue;
ii. sulfinyl aryl, or sulfonyl aryl, wherein aryl is a $C_6$ to $C_{18}$ aromatic hydrocarbon having at least one halogen substituent on the aryl residue;
iii. sulfinyl heteroaryl, or sulfonyl heteroaryl, wherein heteroaryl is a $C_2$ to $C_{20}$ aromatic hydrocarbon having one or more heteroatoms, and wherein the heteroaryl has at least one halogen substituent on the heteroaryl residue;

or in the case that X represents $NR^N$, one $R^N$ may be bridging the two P=N— units to form a ring represented by formula:

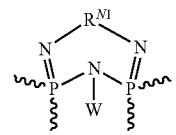

wherein $R^{N1}$ represents —(SO)—, —(SO$_2$)— or —(NR$^{N2}$)— wherein $R^{N2}$ is an electron withdrawing group being selected from -alkyl, —CO-alkyl, or —(CO)—O-alkyl, wherein alkyl is a $C_1$ to $C_{20}$ straight chain, branched chain or cyclic aliphatic hydrocarbon having at least one halogen substituent on the alkyl residue.

18. Process for preparing a chiral phosphoramidimidate of the general formula (I) according to claim 1, said process comprising the steps of:
(a) reacting a compound of the general formulae (V) with a compound of the formula (VI) in the presence of a basic compound in an organic solvent to yield a compound of the formula (VII) as follows:

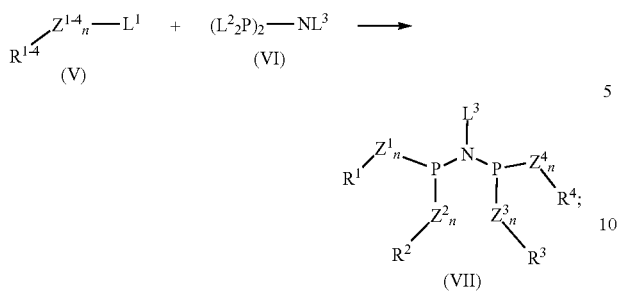

(b) oxidizing compound (VII) to yield compound (VIII) as follows:

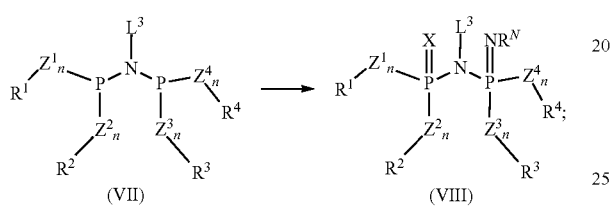

and (c) removing leaving group $L^3$ from compound (VIII) to yield a compound of the general formula (I) as follows:

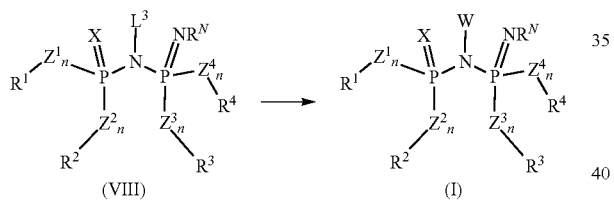

wherein in said formulae (V), (VI), (VII), (VIII) and (I):

$L^1$ is a electropositive leaving group and is selected from hydrogen, a metal selected from Li, Na, K, Rb, Cs, Be, Mg, Ca, Sr, Ba Sc, Ti, V, Cr, Mn, Fe, Co, Ni, Cu, Zn, Y, Zr, Mo, Ru, Rh, Pd, Ag, W, Re, Os, Ir, Pt, Au, Al, Pb, La, Sm, Eu, Yb, or U, or a cationic organic group, or a substituted silicon —Si$R^I R^{II} R^{III}$, wherein $R^I$, $R^{II}$ and $R^{III}$ may be same or different and are as defined in claim 1;

$L^2$ is an electronegative leaving group selected from halogen, alkoxy, aryloxy, heteroaryloxy, sulfonyl, or heteroaryl;

$L^3$ is a leaving group selected from hydrogen, halogen, alkyl, alkoxy, aryloxy, heteroaryloxy, aryl, or heteroaryl; and $R^{1-4}$, $Z^{1-4}$, X, $R^N$, n, and W are as defined in claim 1.

19. Process for preparing a chiral phosphoramidimidate of the general formula (I) according to claim 1, said process comprising the step of: reacting a compound of the general formulae (IX) with a compound of the formula (X) in the presence of a basic compound in an organic solvent to yield a compound of the formula (I) as follows:

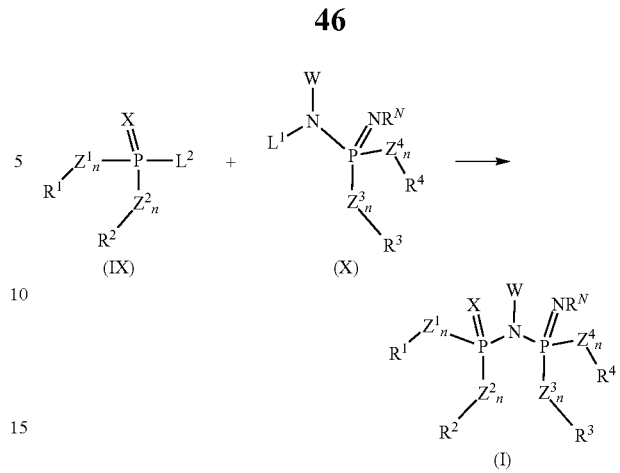

wherein in said formulae (IX), (X), and (I):

$L^1$ is an electropositive leaving group selected from hydrogen, a metal selected from Li, Na, K, Rb, Cs, Be, Mg, Ca, Sr, Ba Sc, Ti, V, Cr, Mn, Fe, Co, Ni, Cu, Zn, Y, Zr, Mo, Ru, Rh, Pd, Ag, W, Re, Os, Ir, Pt, Au, Al, Pb, La, Sm, Eu, Yb, or U, or a cationic organic group, or a substituted silicon —Si$R^I R^{II} R^{III}$, wherein $R^I$, $R^{II}$ and $R^{III}$ may be same or different and are as defined in claim 1;

$L^2$ is an electronegative leaving group selected from halogen, alkoxy, aryloxy, heteroaryloxy, sulfonyl or heteroaryl; and $R^{1-4}$, $Z^{1-4}$, X, $R^N$, n, and W are as defined in claim 1.

20. Process for preparing a chiral phosphoramidimidate of the general formula (I) according to claim 1, said process comprising the step of: reacting a compound of the general formulae (XI) with a compound of the formula (XII) in an organic solvent to yield a compound of the formula (I) as follows:

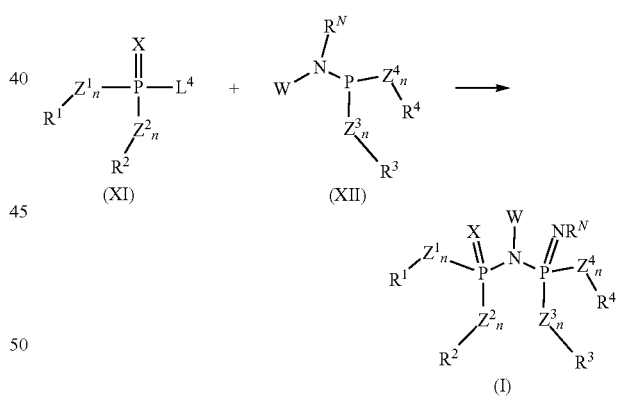

wherein in said formulae (XI), (XII) and (I):

$L^4$ represents a leaving group selected from —$N_3$ or —N($L^1$)($L^2$) and $L^1$ and $L^2$ are independently selected from an electropositive leaving group selected from hydrogen, a metal selected from Li, Na, K, Rb, Cs, Be, Mg, Ca, Sr, Ba Sc, Ti, V, Cr, Mn, Fe, Co, Ni, Cu, Zn, Y, Zr, Mo, Ru, Rh, Pd, Ag, W, Re, Os, Ir, Pt, Au, Al, Pb, La, Sm, Eu, Yb, U or a cationic organic group, or a substituted silicon —Si$R^I R^{II} R^{III}$, wherein $R^I$, $R^{II}$ and $R^{III}$ may be same or different and are as defined in claim 1 above; or an electronegative leaving group selected from halogen, alkoxy, aryloxy, heteroaryloxy, sulfonyl or heteroaryl; and $R^{1-4}$, $Z^{1-4}$, n, and W are as defined in claim 1.

* * * * *